(12) United States Patent
Miyabara et al.

(10) Patent No.: US 9,618,834 B2
(45) Date of Patent: Apr. 11, 2017

(54) POLARIZATION CONVERSION ELEMENT, PROJECTOR, AND METHOD FOR MANUFACTURING POLARIZATION CONVERSION ELEMENT

(71) Applicant: SEIKO EPSON CORPORATION, Tokyo (JP)

(72) Inventors: Mitsuru Miyabara, Matsumoto (JP); Jun Iwabuchi, Matsumoto (JP); Masaki Iwamoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 190 days.

(21) Appl. No.: 14/511,744

(22) Filed: Oct. 10, 2014

(65) Prior Publication Data

US 2015/0103319 A1    Apr. 16, 2015

(30) Foreign Application Priority Data

Oct. 16, 2013    (JP) ................. 2013-215267

(51) Int. Cl.
| | |
|---|---|
| G03B 21/20 | (2006.01) |
| G02B 27/10 | (2006.01) |
| G02B 27/28 | (2006.01) |
| B32B 37/12 | (2006.01) |
| B32B 38/00 | (2006.01) |
| B32B 37/24 | (2006.01) |

(52) U.S. Cl.
CPC ..... *G03B 21/2073* (2013.01); *G02B 27/1046* (2013.01); *G02B 27/286* (2013.01);
(Continued)

(58) Field of Classification Search
CPC ........ G03B 21/20; G03B 21/14; G02B 27/28; G02B 27/10; G02B 5/30; B32B 38/00;
(Continued)

(56) References Cited

U.S. PATENT DOCUMENTS

| | | |
|---|---|---|
| 6,404,550 B1 | 6/2002 | Yajima |
| 2002/0080487 A1 | 6/2002 | Yajima |

(Continued)

FOREIGN PATENT DOCUMENTS

| | | |
|---|---|---|
| CN | 1172956 A | 2/1998 |
| CN | 101038374 A | 9/2007 |

(Continued)

*Primary Examiner* — Sultan Chowdhury
*Assistant Examiner* — Danell L Owens
(74) *Attorney, Agent, or Firm* — Oliff PLC

(57) ABSTRACT

A polarization conversion element includes first light transmissive substrates and second light transmissive substrates each of which has a light incident surface and a light exiting surface and which are disposed alternately, polarization separation films, reflection films, and retardation plates. One of each of the polarization separation films and a plasma polymerization film is formed on a first surface of each of the first light transmissive substrate. Each of the reflection films is formed on a second surface of each of the first light transmissive substrate. An adhesive layer is formed on a first surface of each of the second light transmissive substrates. The other of each of the polarization separation films and the plasma polymerization films is formed on a second surface of each of the corresponding second light transmissive substrates.

10 Claims, 15 Drawing Sheets

(52) U.S. Cl.
CPC ........... *B32B 37/12* (2013.01); *B32B 37/1284* (2013.01); *B32B 38/0004* (2013.01); *B32B 38/0008* (2013.01); *B32B 2037/243* (2013.01); *B32B 2551/00* (2013.01); *Y10T 156/1052* (2015.01)

(58) Field of Classification Search
CPC   B32B 38/08; B32B 37/12; B32B 7/02; G02F 1/13; H04N 9/31
See application file for complete search history.

(56) References Cited

U.S. PATENT DOCUMENTS

| | | |
|---|---|---|
| 2002/0089746 A1 | 7/2002 | Akitaka |
| 2007/0211338 A1 | 9/2007 | Furusato |
| 2010/0134885 A1* | 6/2010 | Kobayashi ........... G02B 27/286 359/485.03 |
| 2010/0246012 A1 | 9/2010 | Takeshita et al. |
| 2011/0256384 A1 | 10/2011 | Matsuzaki et al. |
| 2012/0081671 A1 | 4/2012 | Awanohara |
| 2012/0188471 A1 | 7/2012 | Kobayashi et al. |

FOREIGN PATENT DOCUMENTS

| | | |
|---|---|---|
| CN | 102221724 A | 10/2011 |
| CN | 102445727 A | 5/2012 |
| CN | 102608747 A | 7/2012 |
| JP | A-2010-128419 | 6/2010 |
| JP | A-2011-118257 | 6/2011 |
| JP | A-2011-250276 | 12/2011 |

\* cited by examiner

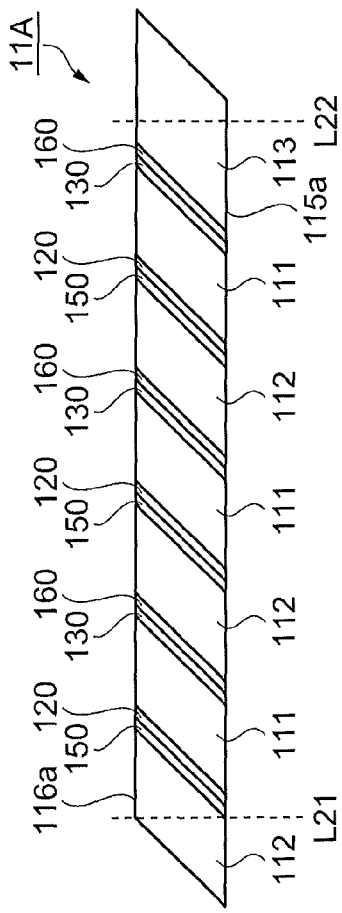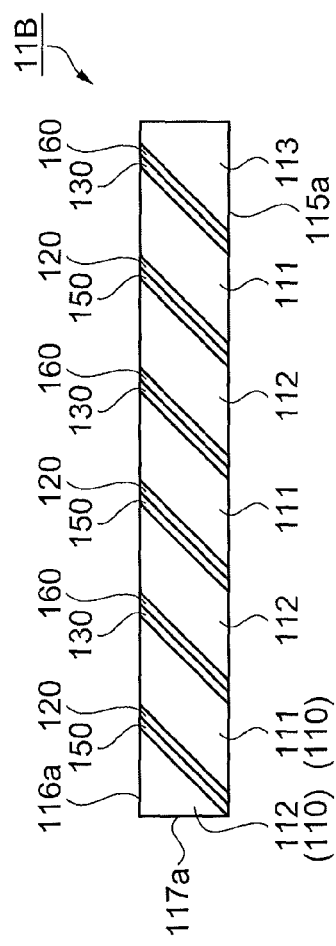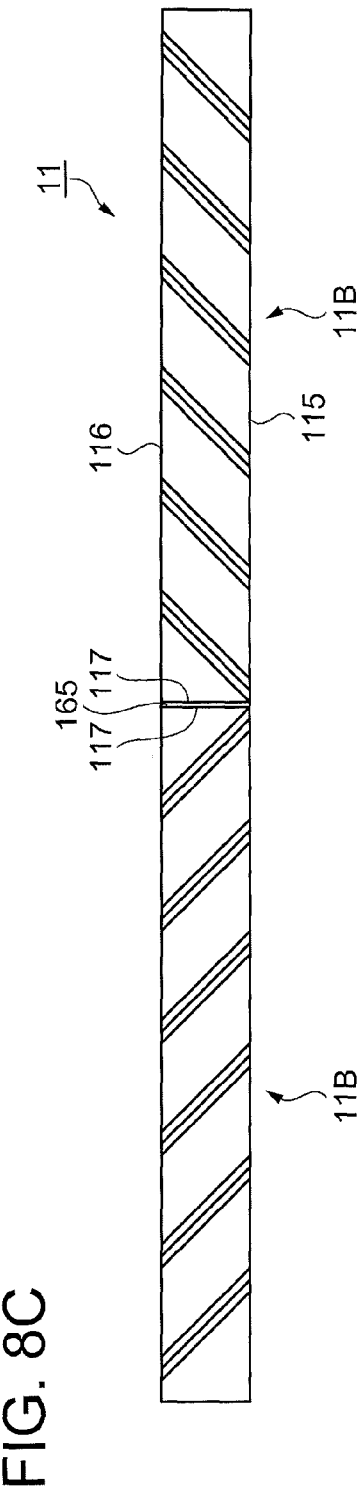
FIG. 8A
FIG. 8B
FIG. 8C

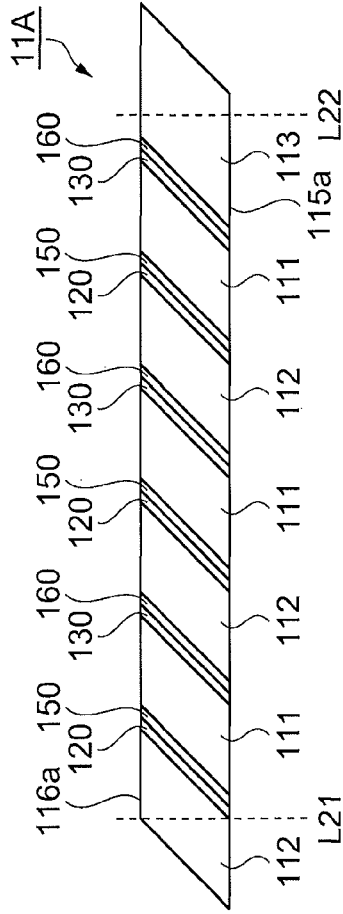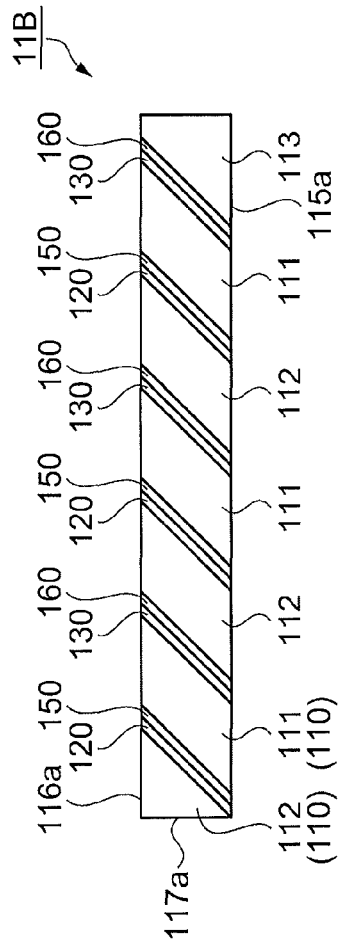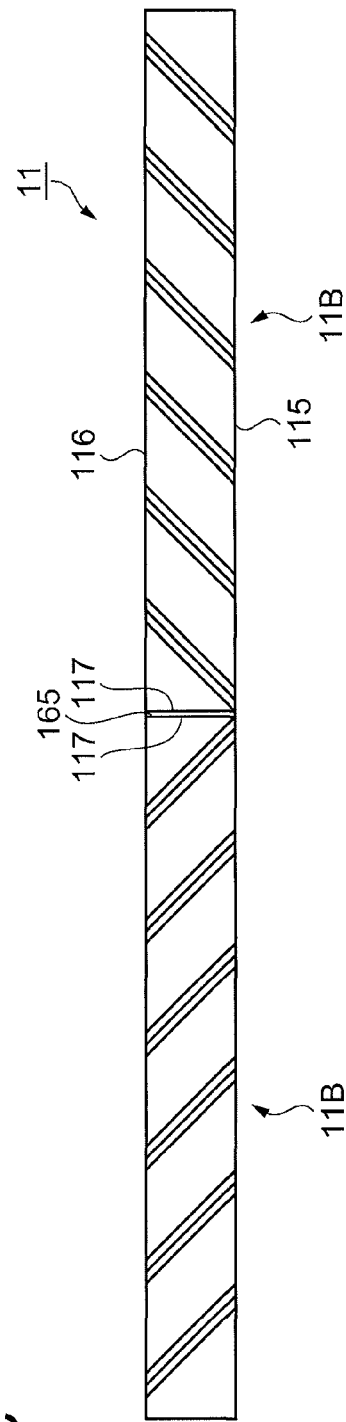
FIG. 14A
FIG. 14B
FIG. 14C

POLARIZATION CONVERSION ELEMENT, PROJECTOR, AND METHOD FOR MANUFACTURING POLARIZATION CONVERSION ELEMENT

BACKGROUND

1. Technical Field

The present invention relates to a polarization conversion element, a projector using the polarization conversion element, and a method for manufacturing the polarization conversion element.

2. Related Art

There is a known projector of related art in which a light modulator modulates light outputted from a light source apparatus in accordance with image information to form an optical image and the formed optical image is projected. A projector of this type includes a polarization conversion element that is placed in a position between the light source apparatus and the light modulator and aligns polarization axes of light rays that form the light outputted from the light source apparatus with one another to increase light usage efficiency. In recent years, a trend toward high-luminance projector requires improvement in light fastness and other properties of the polarization conversion element.

JP-A-2011-118257 discloses a configuration in which a first light transmissive member, a second light transmissive member, and a plasma polymerization film that allows molecular junction between the first and second light transmissive members are stacked on each other to form a polarization conversion element.

To apply the configuration disclosed in JP-A-2011-118257 to a polarization conversion element, characteristics of plasma-polymerization-film-based bonding require that the light transmissive members (light transmissive substrates) be thin, the number of stacked members be small, the light transmissive substrates have high surface precision, and other requirements be satisfied. The configuration described in JP-A-2011-118257 is only applicable to a compact polarization conversion element that satisfies the conditions described above.

To bond light transmissive substrates having thickness variation, warpage, surface undulation, and other disadvantageous properties to each other via a plasma polymerization film, it is necessary to use thin light transmissive substrates and sufficiently pressurize the light transmissive substrates to deform them before bonding. The light transmissive substrates can, however, be bonded to each other only when the bonding strength is greater than a restoring force of the light transmissive substrates that have been elastically deformed, whereas the light transmissive substrates cannot be bonded to each other and the bonded substrates separate from each other or otherwise deteriorate when the restoring force of the light transmissive substrates is greater than the bonding strength.

Further, since a bonding layer formed of a plasma polymerization film has an extremely small thickness ranging from about 0.2 to 0.5 μm, the bonding layer cannot be used as a buffer that buffers variation in thicknesses of the light transmissive substrates, warpage thereof, accumulated rigidity of the multi-layered light transmissive substrates, and other disadvantageous properties. Therefore, when a polarization conversion element is manufactured, the plasma polymerization film cannot buffer variation in size and form and other disadvantageous factors of the members that form the polarization conversion element, resulting in a manufacturing problem.

Further, in manufacturing a polarization conversion element, to bond a polarization separation film formed on one light transmissive substrate to another light transmissive substrate, a UV curable adhesive is typically used. A bonding layer formed of the UV curable adhesive has a thickness ranging from about 3 to 10 μm and can buffer variation in size and form and other disadvantageous properties of the members that form the polarization conversion element. The UV-curable-adhesive-based bonding is, however, undesirably inferior to the plasma-polymerization-film-based bonding in terms of light fastness and heat resistance.

It has therefore been desired to develop a polarization conversion element that has improved light fastness and can be readily manufactured, a projector using the polarization conversion element, and a method for manufacturing the polarization conversion element.

SUMMARY

An advantage of some aspects of the invention is to solve at least a part of the problems described above, and the invention can be implemented as the following forms or application examples.

Application Example 1

This application example is directed to a polarization conversion element including first light transmissive substrates and second light transmissive substrates each of which has a light incident surface and a light exiting surface and which are disposed alternately, polarization separation films that are obliquely disposed with respect to the light incident surfaces and separate incident light into two types of linearly polarized light, reflection films that are disposed in parallel to the polarization separation films and reflect one of the two types of linearly polarized light separated by the polarization separation films, and retardation plates that convert one of the two types of linearly polarized light separated by the polarization separation films. One of each of the polarization separation films and a plasma polymerization film is formed on a first surface of each of the first light transmissive substrates. Each of the reflection films is formed on a second surface of each of the first light transmissive substrates. An adhesive layer is formed on a first surface of each of the second light transmissive substrates. The other of each of the polarization separation films and the plasma polymerization films is formed on a second surface of each of the second light transmissive substrates.

The polarization conversion element described above, which uses the adhesive layers for bonding the reflection films, can use the adhesive layers as a buffer that buffers variation in thickness of the light transmissive substrates, warpage thereof, accumulated rigidity of the multilayered light transmissive substrates, and other disadvantageous properties, whereby the polarization conversion element can be so configured that it is readily manufactured.

Application Example 2

In the polarization conversion element according to the application example described above, it is preferable that one of the two types of linearly polarized light separated by the polarization separation films passes through the first light transmissive substrates, on which the reflection films are formed, and is reflected off the reflection films.

According to the polarization conversion element described above, the incident light is separated by the polarization separation films, and the linearly polarized light having passed through the polarization separation films passes through the plasma polymerization films. Alternatively, the incident light passes through the plasma polymerization films and is then separated by the polarization separation films, and the linearly polarized light reflected off the polarization separation films passes through the plasma polymerization films again. The incident light and the linearly polarized light pass through bonding layers each of which is formed of the plasma polymerization film as described above, and the bonding layers, each of which is formed of the plasma polymerization film, provides molecular bonding Si—O—Si or siloxane bonding. The light fastness and heat resistance of the polarization conversion element can therefore be improved as compared with a case where a UV curable adhesive is used.

On the other hand, since the linearly polarized light separated by and reflected off the polarization separation films passes through the light transmissive substrates on which the reflection films are formed and is reflected off the reflection films, the linearly polarized light reflected off the polarization separation films does not pass through bonding layers each of which is formed of the adhesive layer. The bonding layers, each of which is formed of the adhesive layer, are therefore unlikely to be affected by the linearly polarized light, whereby discoloration and degradation are suppressed.

Therefore, even when a high-luminance light source apparatus is used, the light fastness and heat resistance of the polarization conversion element can be improved. Further, the adhesive layers used as the bonding layers that bond the reflection films and are not affected by the linearly polarized light can be used as a buffer that buffers variation in thickness of the light transmissive substrates, warpage thereof, accumulated rigidity of the multilayered light transmissive substrates, and other disadvantageous properties, whereby the polarization conversion element can be so configured that it is readily manufactured.

As described above, the polarization conversion element can be improved in terms of light fastness and readily manufactured.

Application Example 3

In the polarization conversion element according to the application example described above, it is preferable that each of the polarization separation films is formed on the first surface of the corresponding first light transmissive substrate, and that the plasma polymerization film is formed on the second surface of each of the second light transmissive substrates.

The polarization conversion element described above can be so configured that the incident light is separated by the polarization separation films and the linearly polarized light having passed through the polarization separation films passes through the plasma polymerization films.

Application Example 4

In the polarization conversion element according to the application example described above, it is preferable that the plasma polymerization film is formed on the first surface of each of the first light transmissive substrates, and that each of the polarization separation films is formed on the second surface of the corresponding second light transmissive substrate.

The polarization conversion element described above can be so configured that the incident light passes through the plasma polymerization films and is then separated by the polarization separation films and the linearly polarized light reflected off the polarization separation films passes through the plasma polymerization films again.

Application Example 5

In the polarization conversion element according to the application example described above, it is preferable that the plasma polymerization film is formed on at least one of a surface of each of the polarization separation films and a surface of the light transmissive substrate to be bonded to the polarization separation film.

According to the polarization conversion element described above, in which the plasma polymerization film may be formed on at least one of a surface of each of the polarization separation films and a surface of the light transmissive substrate to be bonded to the polarization separation film, bonding strength of a bonding layer formed of the plasma polymerization film can be ensured. When the plasma polymerization film is formed on the two surfaces described above, the bonding strength of the bonding layer formed of the plasma polymerization films can be improved as compared with a case where the plasma polymerization film is formed on only one of the surfaces described above.

Application Example 6

In the polarization conversion element according to the application example described above, it is preferable that the retardation plates are placed in positions set apart from the light exiting surfaces of the light transmissive substrates.

According to the polarization conversion element described above, an antireflection film can be readily formed on each of the surfaces of the retardation plates and the light transmissive substrates, whereby the light transmissive substrates and the retardation plates can transmit linearly polarized light by an increased amount.

Application Example 7

In the polarization conversion element according to the application example described above, it is preferable that each of the retardation plates is bonded to the light exiting surface of the corresponding light transmissive substrate via a plasma polymerization film.

According to the polarization conversion element described above, the bonding using the plasma polymerization film provides improved light fastness and heat resistance. Further, the dimension (thickness) of the polarization conversion element in the direction in which the linearly polarized light travel can be reduced (thinner) as compared with the configuration in which the retardation plates are so placed that they are set apart from the light exiting surfaces of the light transmissive substrates.

Application Example 8

This application example is directed to a projector including: (a) a light source apparatus that outputs light, (b) any of the polarization conversion elements described above, which converts the light into one type of linearly polarized light, (c) a light modulator that modulates the linearly polarized light having exited out of the polarization conversion element in accordance with image information to form an optical image, and (d) a projection optical apparatus that enlarges and projects the optical image.

The projector described above, which includes the polarization conversion element having improved light fastness, can maintain its optical quality for a long period even when a high-luminance light source apparatus is used.

Application Example 9

This application example is directed to a method for manufacturing a polarization conversion element including: (a) a polarization separation film formation step of forming a polarization separation film on a first surface of a first substrate that has the first surface and a second surface parallel to each other and serves as a base of a first light transmissive substrate, (b) a reflection film formation step of forming a reflection film on the second surface of the first substrate, (c) a plasma polymerization film formation step of forming a plasma polymerization film on a surface of the polarization separation film, (d) an activation step of activating the plasma polymerization film on the first substrate, (e) a first bonding step of bonding the activated plasma polymerization film to a second surface of a second substrate that has a first surface and the second surface parallel to each other and serves as a base of a second light transmissive substrate to form a first block formed of the first substrate and the second substrate integrated with each other, (f) an adhesive layer formation step of sequentially forming adhesive layers on a plurality of the first blocks, the adhesive layer bonding the first surface of the second substrate that forms one of the first blocks to the reflection film on the first substrate that forms another one of the first blocks, (g) a second bonding step of bonding the adhesive layers to each other by curing to form a second block formed of the plurality of the first blocks integrated with each other, and (h) a cutting step of cutting the second block at a predetermined angle with respect to the first surfaces and the second surfaces to form a stacked block having a light incident surface and a light exiting surface parallel to each other.

According to the method for manufacturing a polarization conversion element described above, the polarization separation film is formed on the first surface of the first substrate in the polarization separation film formation step and the reflection film is formed on the second surface of the first substrate in the reflection film formation step. The plasma polymerization film is then formed on the surface of the polarization separation film in the plasma polymerization film formation step. The plasma polymerization film is then activated in the activation step, and the activated plasma polymerization film is bonded to the second surface of the second substrate to form the first block formed of the first substrate and the second substrate integrated with each other in the first bonding step. Thereafter, in the adhesive layer formation step, the adhesive layers are sequentially formed on the plurality of the first blocks to bond the first surface of the second substrate that forms one of the first blocks to the reflection film on the first substrate that forms another one of the first blocks. The adhesive layers are then bonded to each other by curing to form the second block formed of the plurality of the first blocks integrated with each other in the second bonding step. The second block is then cut at a predetermined angle with respect to the first surfaces and the second surfaces to form the stacked block having a light incident surface and a light exiting surface parallel to each other in the cutting step.

The method for manufacturing a polarization conversion element, which includes the polarization separation film formation step, the reflection film formation step, the plasma polymerization film formation step, the activation step, the first bonding step, the adhesive layer formation step, the second bonding step, and the cutting step, allows a polarization conversion element including a bonding layer formed of the plasma polymerization film and a bonding layer formed of the adhesive layer to be readily manufactured.

Application Example 10

In the method for manufacturing a polarization conversion element according to the application example described above, it is preferable that the method further includes a second plasma polymerization film formation step of forming a second plasma polymerization film on the second surface of the second substrate and a second activation step of activating the second plasma polymerization film, and in the first bonding step, the activated plasma polymerization film on the first substrate is preferably bonded to the second plasma polymerization film.

According to the method for manufacturing a polarization conversion element described above, the second plasma polymerization film formation step and the second activation step are further provided to form the second plasma polymerization film on the second surface of the second substrate and activate the second plasma polymerization film. The activated plasma polymerization film on the first substrate is then bonded to the second plasma polymerization film in the first bonding step. The bonding strength of a bonding layer formed of the plasma polymerization films can be further improved.

Application Example 11

This application example is directed to a method for manufacturing a polarization conversion element including: (a) a polarization separation film formation step of forming a polarization separation film on a second surface of a second substrate that has a first surface and the second surface parallel to each other and serves as a base of a second light transmissive substrate, (b) a plasma polymerization film formation step of forming a plasma polymerization film on a surface of the polarization separation film, (c) a reflection film formation step of forming a reflection film on a second surface of a first substrate that has a first surface and the second surface parallel to each other and serves as a base of a first light transmissive substrate, (d) an activation step of activating the plasma polymerization film on the second substrate, (e) a first bonding step of bonding the activated plasma polymerization film to the first surface of the first substrate to form a first block formed of the first substrate and the second substrate integrated with each other, (f) an adhesive layer formation step of sequentially forming adhesive layers on a plurality of the first blocks, the adhesive layer bonding the reflection film on the first substrate that forms one of the first blocks to the first surface of the second substrate that forms another one of the first blocks, (g) a second bonding step of bonding the adhesive layers to each other by curing to form a second block formed of the plurality of the first blocks integrated with each other, and (h) a cutting step of cutting the second block at a predetermined angle with respect to the first surfaces and the second surfaces to form a stacked block having a light incident surface and a light exiting surface parallel to each other.

According to the method for manufacturing a polarization conversion element described above, the polarization separation film is formed on the second surface of the second substrate in the polarization separation film formation step. The plasma polymerization film is then formed on the surface of the polarization separation film in the plasma polymerization film formation step. The reflection film is formed on the second surface of the first substrate in the reflection film formation step. The plasma polymerization film on the second substrate is then activated in the activation step. The activated plasma polymerization film is then bonded to the first surface of the first substrate to form the first block formed of the first substrate and the second substrate integrated with each other in the first bonding step. Thereafter, in the adhesive layer formation step, the adhesive layers are sequentially formed on the plurality of the first blocks to bond the reflection film on the first substrate that forms one of the first blocks to the first surface of the second substrate that forms another one of the first blocks. The adhesive layers are then bonded to each other by curing to form the second block formed of the plurality of the first blocks integrated with each other in the second bonding step. The second block is then cut at a predetermined angle with respect to the first surfaces and the second surfaces to form the stacked block having a light incident surface and a light exiting surface parallel to each other in the cutting step.

The method for manufacturing a polarization conversion element, which includes the polarization separation film formation step, the plasma polymerization film formation step, the reflection film formation step, the activation step, the first bonding step, the adhesive layer formation step, the second bonding step, and the cutting step, allows a polarization conversion element including a bonding layer formed of the plasma polymerization film and a bonding layer formed of the adhesive layer to be readily manufactured.

Application Example 12

In the method for manufacturing a polarization conversion element according to the application example described above, it is preferable that the method further includes a second plasma polymerization film formation step of forming a second plasma polymerization film on the first surface of the first substrate and a second activation step of activating the second plasma polymerization film, and in the first bonding step, the activated plasma polymerization film on the second substrate is preferably bonded to the second plasma polymerization film.

According to the method for manufacturing a polarization conversion element described above, the second plasma polymerization film formation step and the second activation step are further provided to form the second plasma polymerization film on the first surface of the first substrate and activate the second plasma polymerization film. The activated plasma polymerization film on the second substrate is then bonded to the second plasma polymerization film in the first bonding step. The bonding strength of a bonding layer formed of the plasma polymerization films can be further improved.

BRIEF DESCRIPTION OF THE DRAWINGS

The invention will be described with reference to the accompanying drawings, wherein like numbers reference like elements.

FIGS. 8A to 8C show an end processing step and a third bonding step.

FIGS. 14A to 14C show the end processing step and the third bonding step.

DESCRIPTION OF EXEMPLARY EMBODIMENTS

A first embodiment will be described below with reference to the drawings.

First Embodiment

Figure 1:
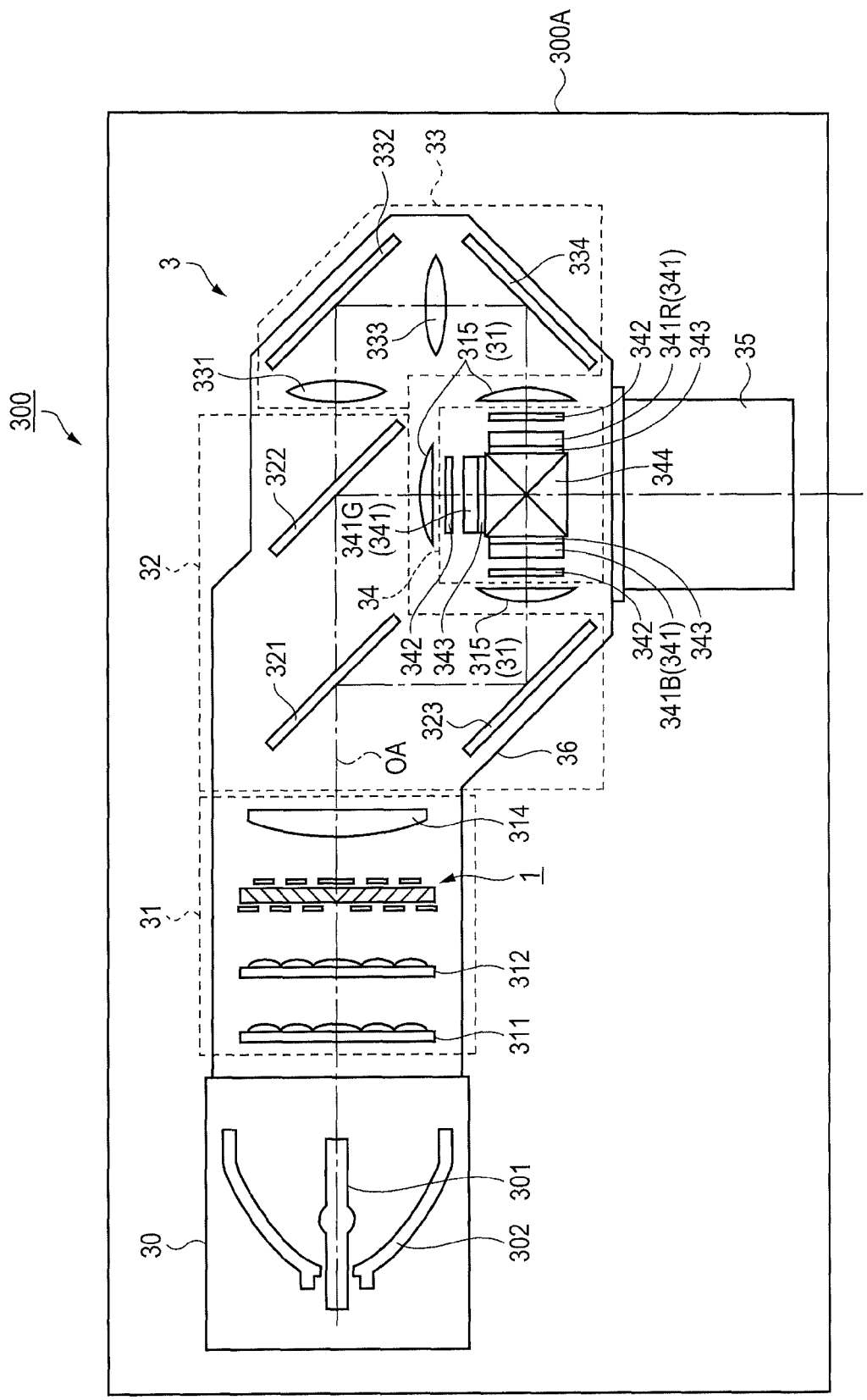
FIG. 1 diagrammatically shows the configuration of an optical system of a projector according to a first embodiment.

FIG. 1 diagrammatically shows the configuration of an optical system of a projector 300 according to the first embodiment. The configuration and operation of the optical system of the projector 300 will be described with reference to FIG. 1.

The projector 300 according to the present embodiment is an electronic apparatus that modulates light outputted from a light source apparatus 30 in accordance with image information (signal) and enlarges and projects the modulated light on a screen or any other projection surface. The projector 300 includes an optical unit 3, a control unit (not shown), a power supply unit (not shown) that supplies the control unit and other components with electric power, and a cooling unit (not shown) that cools the interior of the projector 300, and the units are accommodated in an exterior enclosure 300A.

The optical unit 3 is a unit that optically processes the light outputted from the light source apparatus 30 to form an optical image according to an image signal and projects the optical image under the control of the control unit. The optical unit 3 includes the light source apparatus 30, an illumination optical apparatus 31, a color separation optical apparatus 32, a relay optical apparatus 33, an electro-optical apparatus 34, and an optical component enclosure 36, which accommodates the optical apparatus 30 to 34 and supports and fixes a projection lens 35 in a predetermined position.

The light source apparatus 30 includes a light source 301 and a reflector 302. In the light source apparatus 30, the reflector 302 aligns the traveling directions of light rays that form light outputted from the light source 301 with one another, makes the light rays parallel to an illumination optical axis OA, and outputs them toward the illumination optical apparatus 31. The illumination optical axis OA is a central axis of the light outputted from the light source apparatus 30 toward an area to be illuminated. The light source apparatus 30 in the present embodiment includes an ultrahigh-pressure mercury lamp.

The illumination optical apparatus 31 includes a first lens array 311, a second lens array 312, a polarization conversion element 1, a superimposing lens 314, and parallelizing lenses 315. The first lens array 311 has a configuration in which a plurality of lenslets each having a substantially rectangular contour when viewed in the direction of the illumination optical axis OA are arranged in a matrix. The lenslets divide the light flux outputted from the light source apparatus 30 into sub-light fluxes that travel along the illumination optical axis OA. The second lens arrays 312 has a configuration in which lenslets are arranged in a matrix in correspondence with the sub-light fluxes having exited out of the lenslets of the first lens array 311. The second lens array 312 causes the sub-light fluxes having exited out of the first lens arrays 311 to travel toward the superimposing lens 314.

The polarization conversion element 1 has a function of aligning the randomly polarized sub-light fluxes having exited out of the second lens arrays 312 with one another to form substantially one type of polarized light fluxes that can be used by liquid crystal panels 341. The sub-light fluxes that have exited out of the second lens array 312 and have been converted by the polarization conversion element 1 into substantially one type of polarized light fluxes are substantially superimposed on one another by the superimposing lens 314 on the surfaces of the liquid crystal panels 341. The light fluxes having exited out of the superimposing lens 314 are parallelized by the parallelizing lenses 315 and then superimposed on one another on the liquid crystal panels 341. The polarization conversion element 1 will be described later in detail.

The color separation optical apparatus 32 includes a first dichroic mirror 321, a second dichroic mirror 322, and a reflection mirror 323. The color separation optical apparatus 32 separates the light having exited out of the illumination optical apparatus 31 into the following three types of color light: red (R) light; green (G) light; and blue (B) light.

The relay optical apparatus 33 includes a light-incident-side lens 331, a relay lens 333, and reflection mirrors 332 and 334. The relay optical apparatus 33 guides the R light separated by the color separation optical apparatus 32 to a liquid crystal panel 341R for R light. In the present embodiment, the relay optical apparatus 33 guides the R light. The relay optical apparatus 33 does not necessarily guide the R light but may guide, for example, the B light.

The electro-optical apparatus 34 includes a light-incident-side polarizer 342, the liquid crystal panels 341 (reference character 341R denotes liquid crystal panel for R light, reference character 341G denotes liquid crystal panel for G light, and reference character 341B denotes liquid crystal panel for B light) as light modulators, a light-exiting-side polarizer 343, and a cross dichroic prism 344. The light-incident-side polarizer 342 and the light-exiting-side polarizer 343 are provided for each of the liquid crystal panels 341R, 341G, and 341B.

The liquid crystal panels 341 (341R, 341G, and 341B) modulate the color light fluxes separated by the color separation optical apparatus 32 in accordance with image signals to form optical images. The cross dichroic prism 344 is formed by bonding four rectangular prisms to each other and hence has a substantially square shape in a plan view, and two dielectric multilayer films are formed on the interfaces between the bonded rectangular prisms. The cross dichroic prism 344 combines the optical images formed by the color light fluxes modulated by the liquid crystal panels 341R, 341G, and 341B with one another and causes the combined optical image to travel toward the projection lens 35.

The projection lens 35 as a projection optical apparatus is formed of a combination lens having a plurality of lenses combined with each other and enlarges and projects the optical image that is the combination of the light fluxes modulated by the electro-optical apparatus 34 on a screen or any other projection surface.

Figure 2:
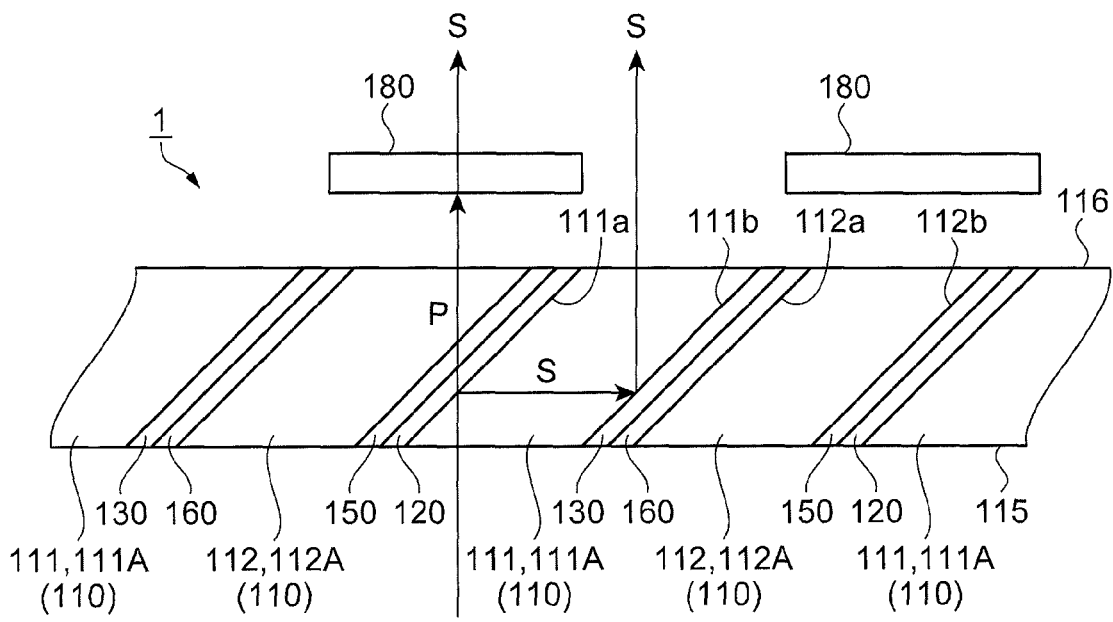
FIG. 2 is a partial cross-sectional view showing the configuration of a polarization conversion element.

FIG. 2 is a partial cross-sectional view showing the configuration of the polarization conversion element 1. In FIG. 2 and the following figures, the dimension of each portion shown therein is so changed as appropriate for ease of description that the portion can be visually recognized. The configuration and operation of the polarization conversion element 1 will be schematically described with reference to FIG. 2.

The polarization conversion element 1 includes light transmissive substrates 110, polarization separation films 120, reflection films 130, retardation plates 180, first bonding layers 150 (plasma polymerization films 151), and second bonding layers 160 (adhesive layers 161), as shown in FIG. 2. The polarization conversion element 1 has a rectangular plate-like shape in a plan view (see FIG. 9).

Each of the light transmissive substrates 110 includes a first light transmissive substrate 111 and a second light transmissive substrate 112 in the present embodiment. Each of the first light transmissive substrates 111 and the second light transmissive substrates 112 has a light incident surface 115 and a light exiting surface 116 so formed that they are parallel to each other, and the two light transmissive substrates are alternately disposed with optical functional films interposed therebetween.

The light transmissive substrates 110 (first light transmissive substrates 111 and second light transmissive substrates 112) are so (obliquely) disposed that surfaces thereof parallel to each other (first surface 111a and second surface 111b of each first light transmissive substrate 111 and first surface 112a and second surface 112b of each second light transmissive substrate 112) are inclined to the light incident surfaces 115 by about 45°. The polarization separation films 120 and the reflection films 130 are alternately disposed on the surfaces described above.

Although will be described later, the first surface 111a and the second surface 111b of each of the first light transmissive substrates 111 are the front and rear surfaces of a first substrate 111A, which serves as a base substrate for forming the first light transmissive substrate 111 in manufacturing steps. Similarly, the first surface 112a and the second surface 112b of each of the second light transmissive substrates 112 are the front and rear surfaces of a second substrate 112A, which serves as a base substrate for forming the second light transmissive substrate 112 in manufacturing steps.

In the present embodiment, a polarization separation film 120 and a reflection film 130 are formed on each of the first light transmissive substrates 111 (first substrates 111A). Specifically, a polarization separation film 120 is formed on the first surface 111a of each of the first substrates 111A, and a reflection film 130 is formed on the second surface 111b thereof. The second light transmissive substrates 112 (second substrates 112A) are bonded to the corresponding first light transmissive substrates 111 (first substrates 111A).

Each of the polarization separation films 120 is so obliquely disposed that it is inclined to the light incident surface 115 by about 45° as described above, and the polarization separation film 120 separates incident light into two types of linearly polarized light. In the present embodiment, each of the polarization separation films 120 reflects one of the two types of linearly polarized light having a polarization axis parallel to the light incident surface of the polarization separation film 120 (S-polarized light in the present embodiment) and transmits the linearly polarized light having a polarization axis perpendicular to that of the S-polarized light. Each of the polarization separation films 120, which operates as described above, separates incident light into the following two types of linearly polarized light: S-polarized light and P-polarized light.

The reflection films 130 are disposed in parallel to each other in between the polarization separation films 120 in such a way that the polarization separation films 120 and the reflection films 130 are alternately disposed, and the reflection films 130 reflect one of the two types of linearly polarized light (S-polarized light in the present embodiment) separated by the polarization separation films 120.

The first bonding layers 150 are layers produced by bonding the polarization separation films 120, which have been formed on the first light transmissive substrates 111 (first substrates 111A), to the second light transmissive substrates 112 (second substrates 112A). In the present embodiment, the bonding is performed by using a plasma polymerization film 151 (see FIGS. 5A and 5B). The first bonding layers 150 (plasma polymerization films 151) transmit the P-polarized light separated by the polarization separation films 120.

The second bonding layers 160 are layers produced by bonding the reflection films 130, which have been formed on the first light transmissive substrates 111 (first substrates 111A), to the second light transmissive substrates 112 (second substrates 112A). In the present embodiment, the bonding is performed by using an adhesive (adhesive layer 161 (see FIG. 6). Since the S-polarized light separated by the polarization separation films 120 passes through the first light transmissive substrates 111, on which the reflection films 130 are formed, and is reflected off the reflection films 130, the S-polarized light does not pass through the second bonding layers 160 (adhesive layers 161).

The retardation plates 180 are so selectively disposed that they face the light exiting surfaces 116 of the first light transmissive substrates 111 and the second light transmissive substrates 112, which are alternately bonded to each other, and that they are set apart from the light exiting surfaces 116. The retardation plates 180 convert the polarization axis of one of the two types of linearly polarized light separated by the polarization separation films 120 into the polarization axis of the other one of the two types of linearly polarized light. In the present embodiment, the P-polarized light separated by the polarization separation films 120 is converted into S-polarized light.

Figure 3:
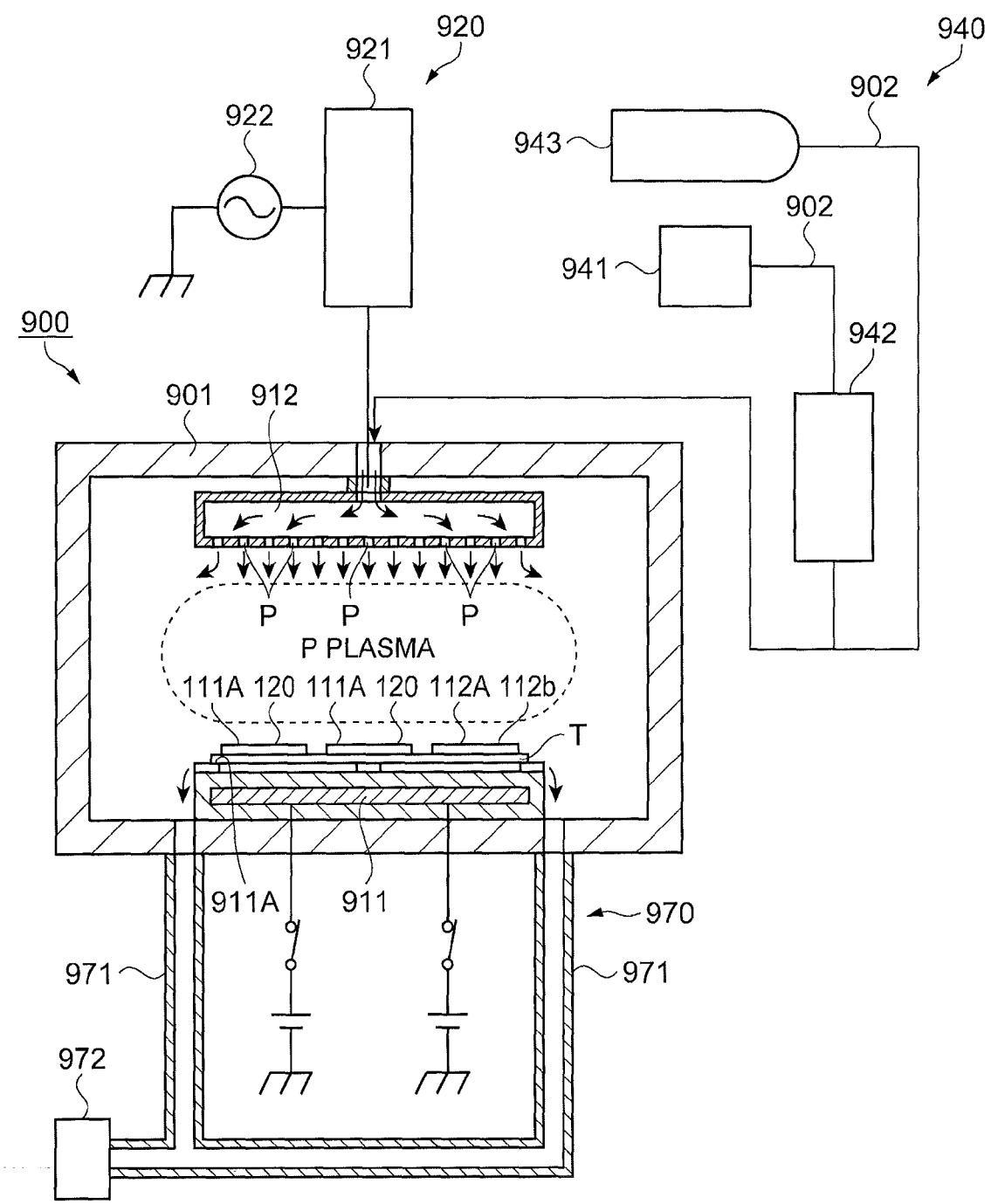
FIG. 3 is a schematic configuration diagram of a plasma polymerization apparatus.
Figure 4A:
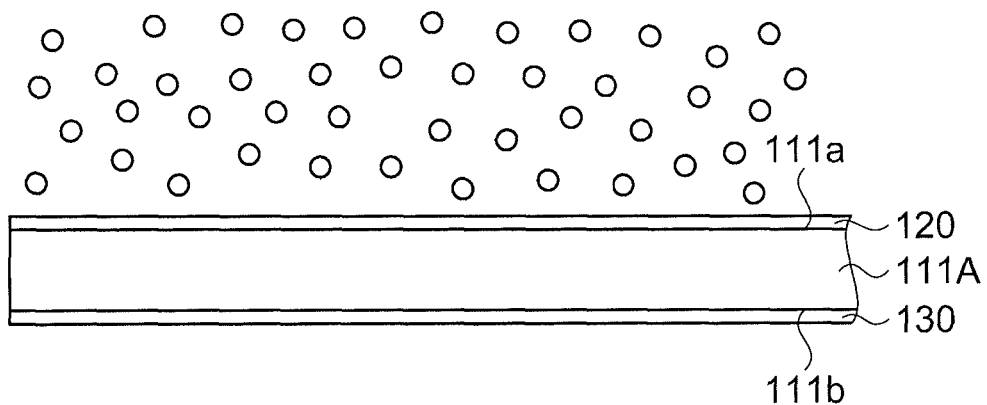
FIGS. 4A to 4C show a plasma polymerization film formation step.
Figure 4B:
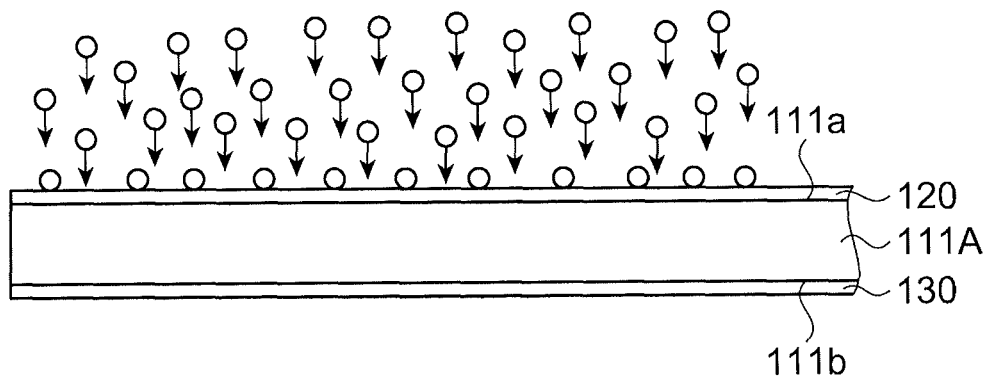
Figure 4C:
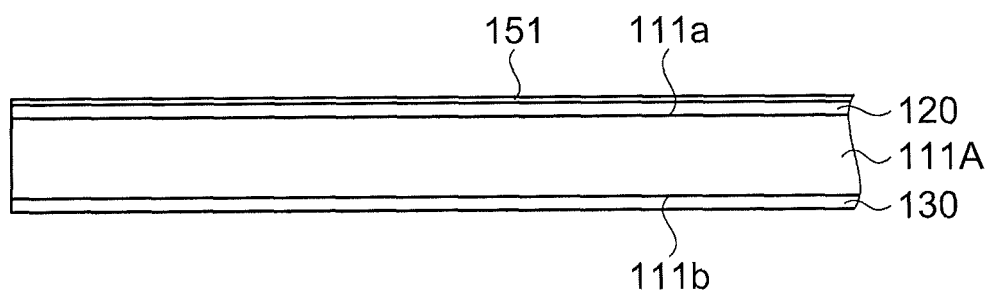
Figure 5A:
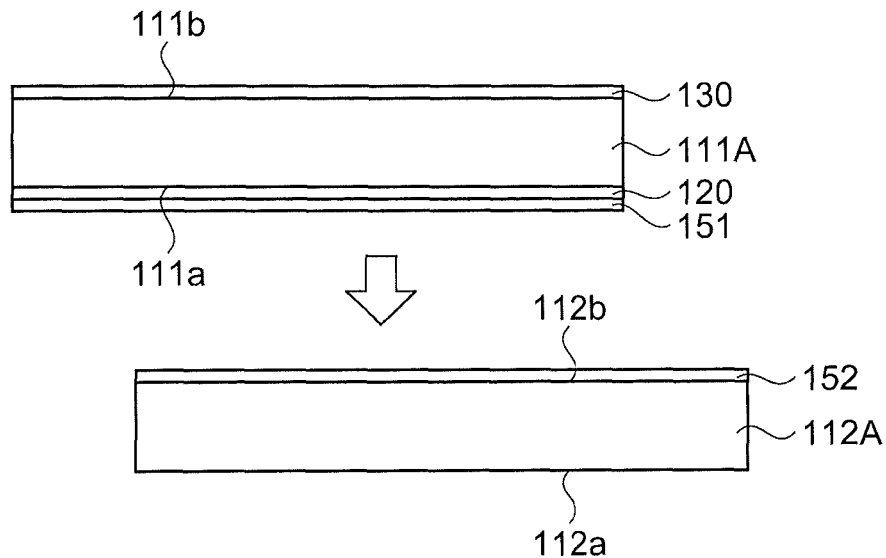
FIGS. 5A and 5B show a first bonding step.
Figure 5B:
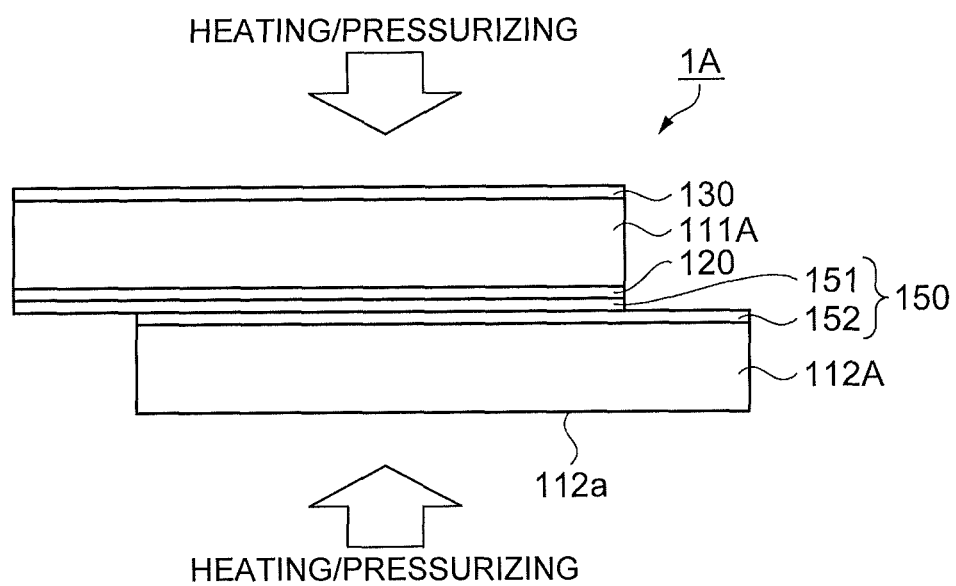
Figure 6:
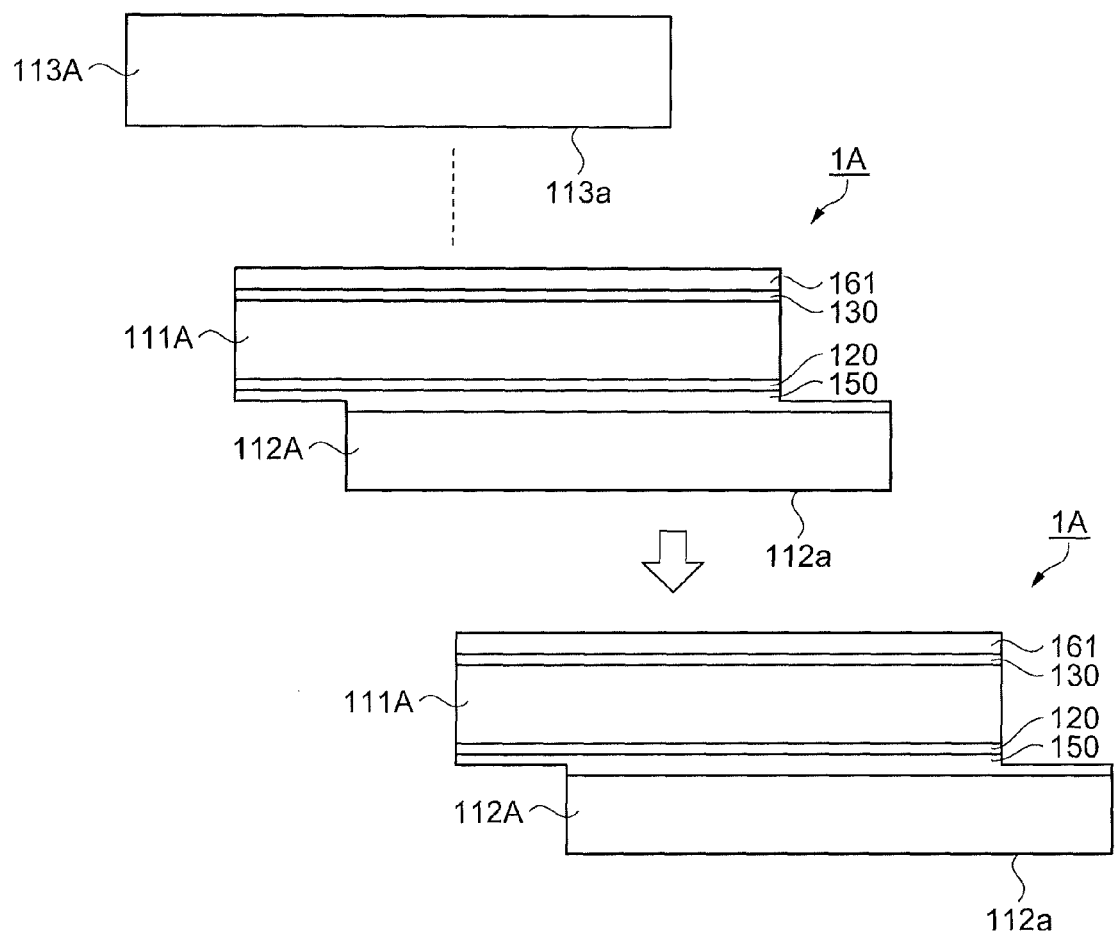
FIG. 6 shows an adhesive layer formation step.
Figure 7:
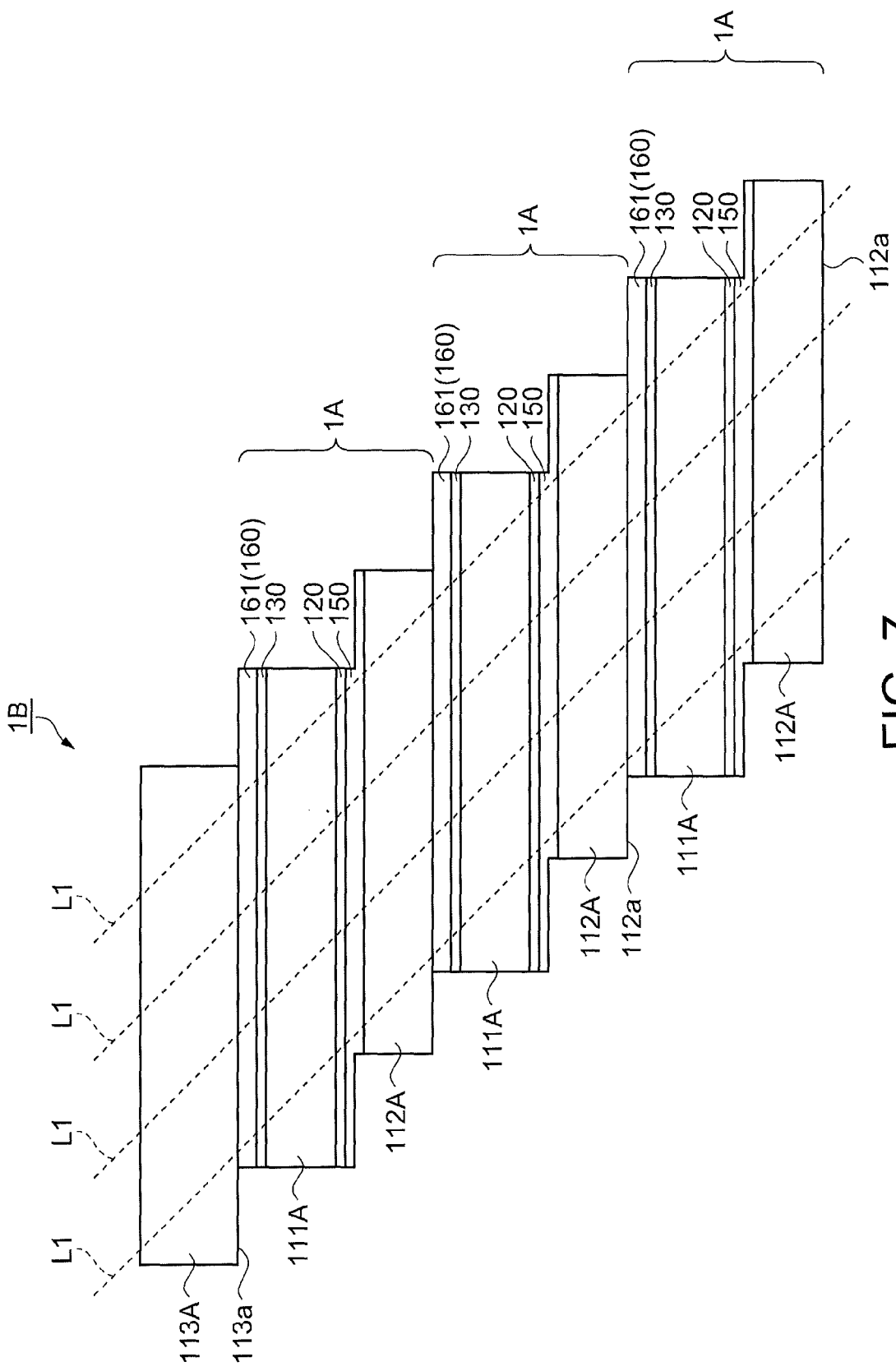
FIG. 7 shows a second bonding step and a cutting step.
Figure 9:
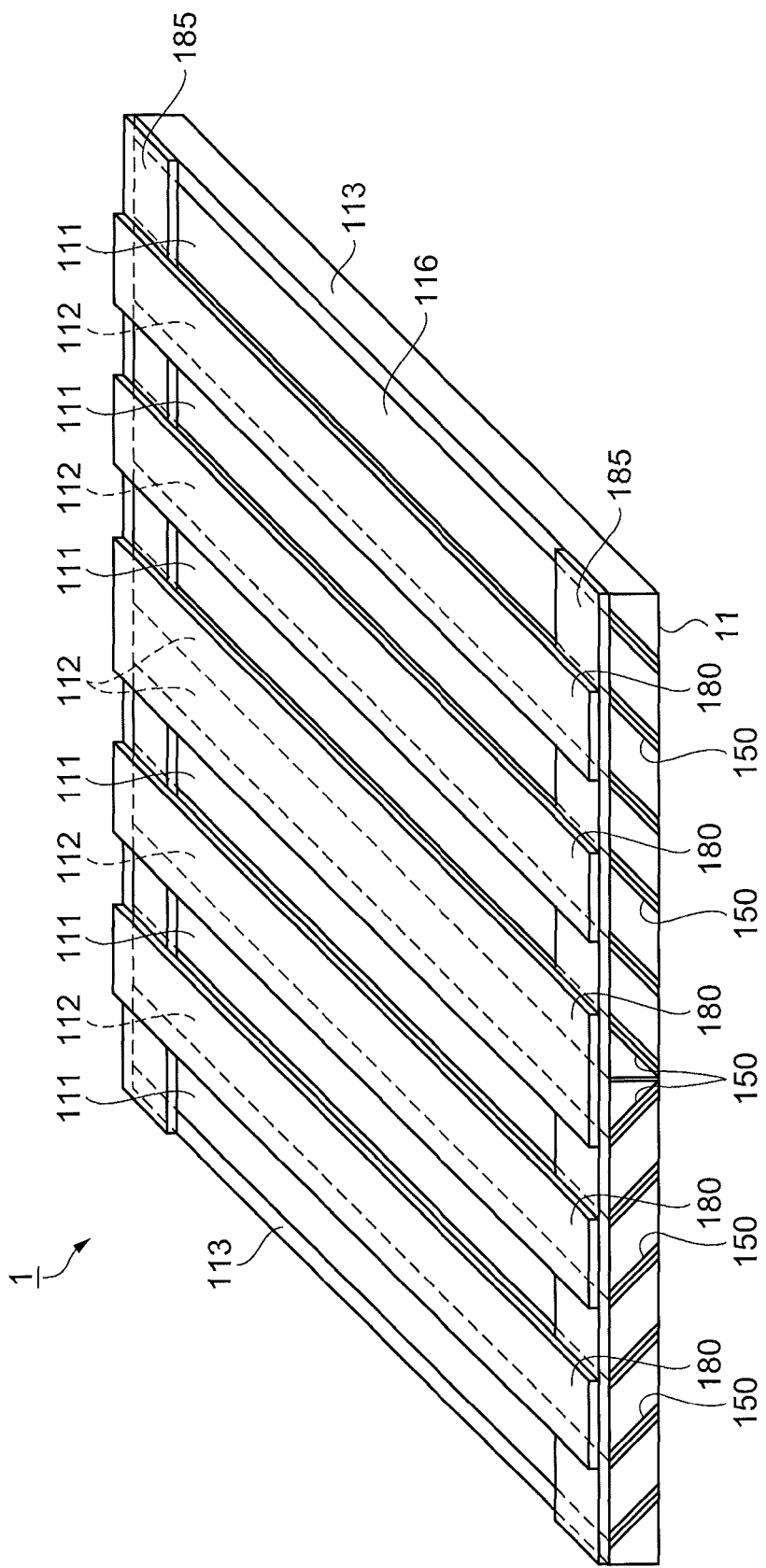
FIG. 9 shows a retardation plate placement step.

FIG. 3 is a schematic configuration diagram of a plasma polymerization apparatus 900. FIGS. 4A to 4C show a plasma polymerization film formation step. FIGS. 5A and 5B show a first bonding step. FIG. 6 shows an adhesive layer formation step. FIG. 7 shows a second bonding step and a cutting step. FIGS. 8A to 8C show an end processing step and a third bonding step. FIG. 9 shows a retardation plate placement step. A method for manufacturing the polarization conversion element 1 will be described with reference to FIGS. 3 to 9.

The configuration of the plasma polymerization apparatus 900 will first be described.

The plasma polymerization apparatus 900 in the present embodiment has a function as a film formation apparatus that forms plasma polymerization (forms film) on a substrate and a function as an activation apparatus that activates the formed plasma polymerization film.

The structure of the plasma polymerization apparatus 900 is described in JP-A-2008-307873 in detail and will therefore be schematically described below.

The plasma polymerization apparatus 900 includes a chamber 901, a first electrode 911 and a second electrode 912, each of which is provided in the chamber 901, a power supply circuit 920, which applies a high-frequency voltage between the first electrode 911 and the second electrode 912, and a gas supply unit 940, which supplies a gas into the chamber 901, as shown in FIG. 3.

The first electrode 911 has a workpiece placement portion 911A, on which a tray T is removably placed. The tray T is so configured that it can accommodate a plurality of first substrates 111A, which have a rectangular shape in a plan view and serve to form the first light transmissive substrates 111. Similarly, the tray T is so configured that it can accommodate a plurality of second substrates 112A, which have a rectangular shape in a plan view and serve to form the second light transmissive substrates 112.

A gas discharge apparatus 970 is connected to the chamber 901 and discharges a mixed gas containing a raw material gas, which will be described later, in such a way that the mixed gas routes through the space between the tray T and the first and second substrates 111A, 112A. The gas discharge apparatus 970 includes a discharge tube 971, which is so provided in a portion adjacent to the first electrode 911, and a suction portion 972, which is formed of a pump for discharging the raw material gas in the vicinity of the tray T through the discharge tube 971.

The power supply circuit 920 includes a matching box 921 and a high-frequency power supply 922. The gas supply unit 940 includes a reservoir 941, which preserves a liquid-state film material, a vaporizer 942, which vaporizes the liquid-state film material into the raw material gas, and a gas cylinder 943, which stores a carrier gas.

The reservoir 941, the vaporizer 942, and the gas cylinder 943 are so connected to the chamber 901 via pipes 902 that a mixed gas of the gas-state film material and the carrier gas is supplied to the second electrode 912. The second electrode 912 has a cavity formed therein, has a portion that faces the chamber 901 and communicates with the vaporizer 942, and has a portion that faces the first electrode 911 and has a plurality of holes P, through which the mixed gas is diffused into the chamber 901.

Examples of the raw material gas include methylsiloxane, hexamethyldisiloxane, and other organosiloxanes, trimethyl gallium, triethyl gallium, trimethyl aluminum, triethyl aluminum, triisobutyl aluminum, trimethyl indium, triethyl indium, trimethyl zinc, triethyl zinc, and other organic-metal-based compounds, a variety of carbon-hydride-based compounds, and a variety of fluorine-based compounds.

The plasma polymerization films 151 produced by using any of the raw material gases described above are made of any of the raw materials described above in a polymerized form (polymer), that is, for example, polyorganosiloxane, an organic metal polymer, a carbon-hydride-based polymer, or a fluorine-based polymer.

The method for manufacturing the polarization conversion element 1 will be described below on a step basis.

Polarization Separation Film Formation Step, Reflection Film Formation Step

As a step to be carried out before a polarization separation film formation step and a reflection film formation step are carried out, the first substrates 111A, which have a rectangular shape in a plan view and serve as base substrates for forming the first light transmissive substrates 111, undergo a mirror finish process in which the surfaces of the first substrates 111A are ground into smooth surfaces. Further, the second substrates 112A, which have a rectangular shape in a plan view and serve as base substrates for forming the second light transmissive substrates 112, undergo a mirror finish process in which the surfaces of the second substrates 112A are ground into smooth surfaces. In the present embodiment, the first substrates 111A and the second substrate 112A are made of high-refractive-index glass.

The polarization separation film formation step is a step of forming the polarization separation films on the first surfaces 111a of the first substrates 111A. The reflection film formation step is a step of forming the reflection films 130 on the second surfaces 111b of the first substrates 111A.

Each of the polarization separation films 120 is formed of a dielectric multilayer film. Each of the polarization separation films 120 is specifically formed by first forming a low-refractive-index layer as a first layer, forming a high-refractive-index layer thereon, and alternately forming the low-refractive-index layer and the high-refractive-index layer with the uppermost layer being the high-refractive-index layer on the first surfaces 111a of the first substrates 111A. The layers described above are formed, for example, in an evaporation process, as in related art. The polarization separation films 120 transmit P-polarized light and reflect S-polarized light in the present embodiment.

The reflection films 130 are made, for example, of a single metal material, such as Al, Au, Ag, Cu, or Cr, each of which has high reflectance, or an alloy containing a plurality of the metals described above and formed, for example, in an evaporation process. The reflection films 130 may instead be the same as the polarization separation films 120. The reflection films 130 reflect the S-polarized light reflected off the polarization separation films 120 in the present embodiment.

Plasma Polymerization Film Formation Step, Second Plasma Polymerization Film Formation Step A plasma polymerization film formation step is a step of forming a plasma polymerization film 151 by using a plasma polymerization method on the surface of the polarization separation film 120 formed on the first surface 111a of each of the first substrates 111A, as shown in FIGS. 4A to 4C. Although not shown, a second plasma polymerization film formation step is a step of forming a plasma polymerization film (second plasma polymerization film 152) on the second surface 112b of each of the second substrates 112A. In the present embodiment, the plasma polymerization apparatus 900 described above is used to carry out the plasma polymerization film formation step and the second plasma polymerization film formation step at the same time.

The second plasma polymerization films 152 are configured in the same manner as the plasma polymerization films 151 but have a different name and reference character so that they are distinguished from the plasma polymerization films 151 formed on the first substrates 111A.

In the plasma polymerization film formation step and the second plasma polymerization film formation step, a plurality of flat-plate shaped first substrates 111A and second substrates 112A are first placed on the tray T, and the placement operation is performed outside the plasma polymerization apparatus. Specifically, the first substrates 111A are so placed that the reflection films 130 thereon face the tray T and the polarization separation films 120 thereon face outward (with the polarization separation films 120 facing the second electrode 912 when the tray T is placed in the chamber 901). The second substrates 112A are so placed that the first surfaces 112a thereof face the tray T and the second surfaces 112b thereof face outward. The tray T on which the first substrate 111A and the second substrate 112A are placed is then placed on the workpiece placement portion 911A in the chamber 901.

The gas supply unit 940 is then operated to supply the mixed gas formed of the raw material gas and the carrier gas into the chamber 901. The supplied mixed gas travels through the second electrode 912 and fills the interior of the chamber 901, and the mixed gas containing the raw material gas is exposed to the uppermost layer of the polarization separation film 120 formed on each of the first substrates 111A (FIGS. 3 and 4A). At the same time, the mixed gas is exposed to the second surfaces 112b of the second substrates 112A (FIG. 3).

A high-frequency voltage is then applied between the first electrode 911 and the second electrode 912 to cause the gas molecules present between the electrodes 911 and 912 to be ionized, followed by generation of plasma. The energy of the plasma decomposes the molecules of the raw material gas. When the decomposed molecules recombine with each other and hence polymerize, the resultant polymer adheres to and deposits on the surface of the uppermost layer of each of the polarization separation films 120, as shown in FIG. 4B. The plasma polymerization film 151 is thus formed on the uppermost layer of each of the polarization separation films 120, as shown in FIG. 4C. Similarly, the polymer adheres to and deposits on the second surface 112b of each of the second substrates 112A. The second plasma polymerization film 152 (FIGS. 5A and 5B) is thus formed.

Activation Step, Second Activation Step

An activation step is a step of activating the surfaces of the plasma polymerization films 151 on the first substrates 111A. A second activation step is a step of activating the surfaces of the second plasma polymerization films 152 on the second substrates 112A. In the present embodiment, the plasma polymerization apparatus 900 is used to carryout the activation step and the second activation step at the same time.

Specifically, after the plasma polymerization film formation step and the second plasma polymerization film formation step are completed, discharge is allowed to occur between the first electrode 911 and the second electrode 912 for plasma irradiation. The plasma irradiation activates the plasma polymerization films 151, which have been formed on the surfaces of the polarization separation films 120, and the second plasma polymerization films 152, which have been formed on the surfaces of the second surfaces 112b. The plasma can, for example, be produced from one of oxygen, argon, nitrogen, air, and water or two or more of them mixed with one another. Oxygen is used in the present embodiment.

First Bonding Step

A first bonding step is a step of bonding the activated plasma polymerization films 151 on the first substrates 111A and the activated second plasma polymerization films 152 on the second substrates 112A to each other to form first blocks 1A, each of which is formed of the first substrate 111A and the second substrate 112A integrated with each other.

The plasma polymerization film 151 formed on the polarization separation film 120 on each of the first substrates 111A is layered on the second plasma polymerization film 152 formed on the second surface 112b of the corresponding second substrate 112A, as shown in FIG. 5A. When the plasma polymerization films are layered on each other, the first substrate 111A and the second substrate 112A are so arranged that the ends thereof are shifted from each other.

A fixture (not shown) is then used to pressurize the layered first substrate 111A and second substrate 112A from opposite sides, specifically, the side facing the reflection film 130 on the first substrate 111A and the side facing the first surface 112a of the second substrate 112A, as shown in FIG. 5B. During the pressurization, the fixture is heated. The pressurizing along with the heating allows the plasma polymerization film 151 and the second plasma polymerization film 152 to be securely bonded to each other based on molecular bonding Si—O—Si or siloxane bonding to form a bonding layer (which is called first bonding layer 150). The first bonding layer 150 integrates the first substrate 111A and the second substrate 112A with each other to form the first block 1A. In the present embodiment, a plurality of first blocks 1A are formed.

Adhesive Layer Formation Step

An adhesive layer formation step is a step of forming an adhesive layer 161 by applying an adhesive for bonding the plurality of first blocks 1A to each other.

To bond the first surface 112a of the second substrate 112A that forms one first block 1A to the reflection film 130 on the first substrate 111A that forms another first block 1A, an adhesive is applied onto the first surface 112a of the one first block 1A or the surface of the reflection film 130 on the another first block 1A to form the adhesive layer 161, as shown in FIG. 6.

Specifically, in the present embodiment, an adhesive is applied onto the surface of the reflection film 130 that forms one of the first blocks 1A to form the adhesive layer 161, as shown in FIG. 6. The adhesive layer 161 is then successively formed on the surface of the reflection film 130 on each of the plurality of first blocks 1A in correspondence with the number of blocks to be layered on each other. In the present embodiment, the adhesive is a UV curable adhesive.

The first blocks 1A are then so arranged that they are sequentially layered on each other. Specifically, the first surface 112a of the second substrate 112A that forms one first block 1A is layered on the adhesive layer 161 having been applied onto the reflection film 130 on the first substrate 111A that forms another first block 1A. The layering operation is repeated in correspondence with the number of necessary blocks. When the first blocks 1A are layered on each other, the one first block 1A and the another first block 1A are so arranged that the ends thereof are shifted from each other.

In the present embodiment, at the final first block 1A of the thus sequentially layered first blocks 1A, a third substrate 113A (surface 113a of third substrate 113A), which differs from the first substrates 111A and the second substrates 112A, has a rectangular shape in a plan view, and has surfaces parallel to each other, is layered on the adhesive layer 161 formed on the reflection film 130 on the final first block 1A, as shown in FIG. 6.

The third substrate 113A is a substrate that has a rectangular shape in a plan view and serves as a base for a third light transmissive substrate 113, which eventually forms an end portion of the polarization conversion element 1. The third substrate 113A is formed to be thicker than the other substrates, the first substrates 111A and the second substrates 112A. Further, the third substrate 113A has undergone a mirror finish process in which the surfaces thereof are ground into smooth surfaces. In the present embodiment, the third substrate 113A is made of soda glass (blue plate glass) having light transmittance lower than the transmittance of the first substrates 111A and the second substrates 112A.

Second Bonding Step

A second bonding step is a step of bonding the plurality of first blocks 1A layered with the adhesive layers 161 therebetween to each other to form a unitary second block 1B.

The plurality of first blocks 1A layered as shown in FIG. 7 are irradiated with ultraviolet light. The ultraviolet light passes through the polarization separation films 120 and the reflection films 130 and cures the adhesive layer 161 placed in each of the first blocks 1A. As a result, bonding layers (which are called second bonding layers 160) are formed. The second bonding layers 160 allow the plurality of layered first blocks 1A to form the unitary second block 1B.

Cutting Step

A cutting step is a step of cutting the unitary second block 1B at a predetermined angle with respect to a flat plane (first surfaces 112a of second substrates 112A, for example) to form a stacked block 11A having the light incident surface 115 and the light exiting surface 116 parallel to each other.

The second block 1B is cut at a predetermined angle (45° (indicated by broken lines L1)) with respect to the flat plane (first surfaces 112a of second substrates 112A) at predetermined intervals, as shown in FIG. 7. As a result, a plurality of stacked blocks 11A are formed. In the cutting step in the present embodiment, the cutting is performed by using a wire saw. FIG. 8A shows one of the stacked blocks 11A formed in the cutting step.

Forming the stacked blocks 11A allows the first substrates 111A to form the first light transmissive substrates 111 and the second substrates 112A to form the second light transmissive substrate 112, as shown in FIG. 8A. Further, the third substrate 113A forms the third light transmissive substrate 113. Cut surfaces 115a and 116a, along which the cutting has been performed and which are parallel to each other, are processed to form the light incident surface 115 and the light exiting surface 116 parallel to each other in a step described later.

End Processing Step

An end processing step includes a first grinding step of coarsely grinding the cut surfaces of each of the stacked blocks 11A, an end cutting step of cutting both end portions of each of the stacked blocks 11A having undergone the first grinding step to form a stacked block 11B, and a second grinding step of grinding each of the stacked blocks 11B having undergone the end cutting step in such a way that the stacked block 11B has mirror finished surfaces.

In the first grinding step, the cut surfaces 115a and 116a of each of the stacked blocks 11A are coarsely ground. The coarse grinding is performed by using a lapping-based grinding method. The cut surfaces 115a and 116a, which are rough surfaces after undergoing the cutting step, are thus made roughly smooth.

In the end cutting step, both ends of each of the stacked blocks 11A are cut in the direction perpendicular to the cut surface 115a of the stacked block 11A (indicated by broken lines L21 and L22), as shown in FIG. 8A. The cutting line indicated by the broken line L21 is so set that the cutting line extends through the second light transmissive substrate 112 located at the end and substantially passes through the point on the cut surface 115a where the second light transmissive substrate 112 located at the one end is bonded to the polarization separation film 120 adjacent thereto (first bonding layer 150). The cutting line indicated by the broken line L22 is so set that the cutting line extends through the third light transmissive substrate 113 located at the other end and slightly set apart from the position on the cut surface 116a where the third light transmissive substrate 113 is bonded to the reflection film 130 adjacent thereto (second bonding layer 160). In the end cutting step in the present embodiment, the cutting is performed by using a slicer. FIG. 8B shows one of the stacked blocks 11B formed in the end cutting step.

In the second grinding step, mirror finish grinding using a polishing-based grinding method is performed not only on the cut surfaces 115a and 116a of each of the stacked blocks 11B having undergone the first grinding step but also on a cut surface 117a of the stacked block 11B formed in the end cutting step (surface cut along broken line L21). As a result, the cut surfaces 115a, 116a, and 117a are mirror finished. The cut surface 117a, which undergoes the mirror finish process, will form a bonding cut surface 117 used in a third bonding step, which will be described later.

Third Bonding Step

A third bonding step is a step of bonding the ends (cut surfaces 117) of two stacked blocks 11B having undergone the second grinding step to form a polarization conversion element body 11.

The cut surfaces 117 are so bonded to each other that the two stacked blocks 11B are symmetrically disposed (constituent members thereof are symmetrically disposed), as shown in FIG. 8C. The bonding is performed by applying a UV curable adhesive onto one of the cut surfaces 117, layering the one cut surface 117 on the other cut surface 117, and irradiating the resultant structure with ultraviolet light to cure the adhesive. The layer formed by the bonding operation is called a third bonding layer 165.

After the polarization conversion element body 11 is formed, the cut surface 115a described above functions as the light incident surface 115, on which the light having exited out of the second lens array 312 is incident, in the present embodiment. The cut surface 116a described above functions as the light exiting surface 116, through which polarized light separated by the polarization conversion element body 11 exits.

Antireflection Film Formation Step

An antireflection film formation step is a step of forming antireflection films (not shown) on the polarization conversion element body 11.

A dielectric multilayer film is coated on each of the light incident surface 115 and the light exiting surface 116 of the polarization conversion element body 11, which has a rectangular shape in a plan view, shown in FIG. 8C to form an antireflection film (not shown). The antireflection films prevent loss of light due to reflection at the first light transmissive substrates 111 and the second light transmissive substrates 112 to improve transmittance. At the same time, an antireflection film (not shown) is formed on each of the light incident surface and the light exiting surface of each of the retardation plates 180, which will be described later.

Retardation Plate Placement Step

A retardation plate placement step is a step of selectively placing the retardation plates 180 along the light exiting surface 116 of the polarization conversion element body 11.

Each of the retardation plates 180 is a half-wave plate made of quartz in the present embodiment. The retardation plates 180 convert the P-polarized light having passed through the polarization separation films 120 into S-polarized light.

The retardation plates 180 are so placed in the present embodiment that they are set apart from the light exiting surface 116 of the polarization conversion element body 11, as shown in FIG. 9. Specifically, in the polarization conversion element body 11 having a rectangular shape in a plan view, double-sided adhesive members 185 each having a strip-like shape are first attached to both end portions of the light exiting surface 116, which are portions that do not contribute to the polarization conversion (portions on which no incident light is incident). In the present embodiment, each of the double-sided adhesive members 185 is what is called a double-sided tape. The retardation plates 180 are then placed on the upper surfaces of the attached double-sided adhesive members 185 from the above the double-sided adhesive members 185 in such a way that the positions of the retardation plates 180 coincide with the positions corresponding to the polarization separation films 120, and the retardation plates 180 are pressed against the double-sided adhesive members 185. The retardation plates 180 are thus mounted.

The polarization conversion element 1 is completed by carrying out the series of manufacturing steps described above.

Figure 10:
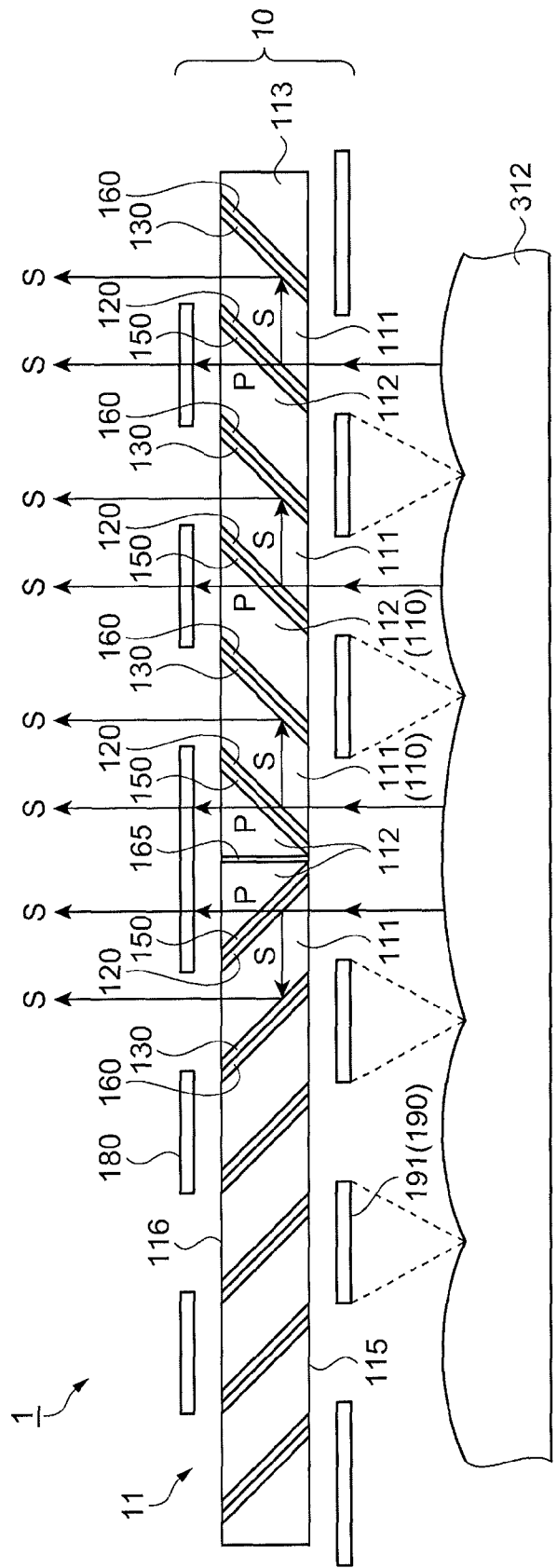
FIG. 10 is a cross-sectional view showing a state in which the polarization conversion element is placed in a fixing frame.

FIG. 10 is a cross-sectional view showing a state in which the polarization conversion element 1 is placed in a fixing frame 190. FIG. 10 also shows the second lens array 312, which is disposed on the optical path in a position upstream of the polarization conversion element 1 (polarization conversion apparatus 10) in the optical unit 3 (FIG. 1). The assembly of the polarization conversion element 1 into the fixing frame 190 (light blocking plates 191) and the operation of the polarization conversion element 1 will be described with reference to FIG. 10.

The polarization conversion element 1, when it is placed on and fixed to the fixing frame 190 (details of which are omitted), in which light blocking plates 191 are formed, forms the polarization conversion apparatus 10. The polarization conversion apparatus 10 is accommodated in the optical component enclosure 36 (FIG. 1) and operates as the polarization conversion element 1 (polarization conversion apparatus 10).

The light having exited out of the second lens array 312 is formed of light fluxes that have been collected by the lenslets and have random polarization axes. The light blocking plates 191 block part of the light having exited out of the second lens array 312, specifically, light that produces non-effective polarized light, as indicated by the broken lines in FIG. 10. In the present embodiment, the light blocking plates 191 block light incident on the light incident surfaces 115 of the second light transmissive substrates 112. The light that is not blocked by the light blocking plates 191 is incident on the light incident surfaces 115 of the first light transmissive substrates 111 and produces effective polarized light in the present embodiment.

The operation of each constituent portion of the polarization conversion element 1 will be described in detail.

The light incident on the light incident surfaces 115 of the first light transmissive substrates 111 is separated by the polarization separation films 120 into P-polarized light and S-polarized light. In the present embodiment, the P-polarized light transmits the polarization separation films 120. The S-polarized light is so reflected off the polarization separation films 120 that the optical path of the S-polarized light is changed by about 90° and passes through the first light transmissive substrates 111.

The P-polarized light having passed through the polarization separation films 120 passes through the first bonding layers 150, each of which is formed of the plasma polymerization film 151. The P-polarized light having passed through the first bonding layers 150 passes through the second light transmissive substrates 112 and exits through the light exiting surface 116. The P-polarized light having exited through the light exiting surface 116 is incident on the retardation plates 180, which rotate the polarization axis of the P-polarized light by 90° and hence convert the P-polarized light into S-polarized light, which exits out of the polarization conversion element 1 (retardation plates 180).

On the other hand, the S-polarized light having been reflected off the polarization separation films 120 and having passed through the first light transmissive substrates 111 is reflected off the reflection films 130. The S-polarized light reflected off the reflection films 130 travels along the optical path changed by about 90°, passes through the first light transmissive substrates 111, and exits as S-polarized light through the light exiting surface 116. The light having exited out of the polarization conversion apparatus 10 (polarization conversion element 1) is therefore limited to substantially one type of polarized light or S-polarized light.

The reflection films 130 are bonded to the second light transmissive substrates 112 via the second bonding layers 160, each of which is formed of the adhesive layer 161. The S-polarized light having been reflected off the polarization separation films 120 and having passed through the first light transmissive substrates 111 is reflected off the reflection films 130 and hence does not pass through the second bonding layers 160. The second bonding layers 160 are therefore unlikely to be affected by the S-polarized light.

The optical design of the polarization conversion element 1 does not cause a large amount of collected light from the second lens array 312 to pass through the third bonding layer 165, where two stacked blocks 11B are bonded to each other with an adhesive. The amount of light that passes through the third bonding layer 165 is therefore small. The light fastness and heat resistance of the third bonding layer 165 is therefore not critical in the present embodiment.

According to the embodiment described above, the following advantageous effects are provided.

The polarization conversion element 1 according to the present embodiment, which uses the adhesive layer 161 as the second bonding layer 160 for bonding each of the reflection films 130, can use the second bonding layer 160 as a buffer that buffers variation in thickness of the corresponding light transmissive substrate 110 (first light transmissive substrate 111 and second light transmissive substrate 112), warpage thereof, accumulated rigidity of the multilayered light transmissive substrates 110, and other disadvantageous properties, whereby the polarization conversion element 1 can be so configured that it is readily manufactured.

The polarization conversion element 1 according to the present embodiment includes the first bonding layers 150, which are each formed of the plasma polymerization film 151 (and second plasma polymerization film 152) and bond the polarization separation films 120 formed on the first light transmissive substrates 111 to the second light transmissive substrates 112. The P-polarized light separated by the polarization separation films 120 passes through the polarization separation films 120 and the first bonding layers 150. The P-polarized light passes through the first bonding layers 150, each of which is formed of the plasma polymerization film 151 (and second plasma polymerization film 152) described above and provides molecular bonding Si—O—Si or siloxane bonding. The light fastness and heat resistance of the polarization conversion element can therefore be improved as compared with a case where a UV curable adhesive is used.

On the other hand, since the S-polarized light separated by and reflected off the polarization separation films 120 passes through the first light transmissive substrates 111, on which the reflection films 130 are formed, and is reflected off the reflection films 130, the S-polarized light does not pass through the second bonding layers 160, each of which is formed of the adhesive layer 161. The second bonding layers 160 are therefore unlikely to be affected by the S-polarized light, whereby discoloration and degradation are suppressed.

Therefore, even when a high-luminance light source apparatus 30 is used, the light fastness and heat resistance of the polarization conversion element 1 can be improved.

As described above, the polarization conversion element 1 can be improved in terms of light fastness and readily manufactured.

The polarization conversion element 1 according to the present embodiment can be so configured that the polarization separation films 120 and the reflection films 130 are formed on the first light transmissive substrates 111 and that linearly polarized light (P-polarized light) having been separated by the polarization separation films 120 and having passed through the polarization separation films 120 passes through the first bonding layers 150.

In the polarization conversion element 1 according to the present embodiment, the plasma polymerization film 151 is formed on the surface of each of the polarization separation films 120, and the second plasma polymerization film 152 is formed on the surface (second surface 112b) of each of the second light transmissive substrates 112, which are bonded to the polarization separation films 120. The bonding strength of the first bonding layers 150 can be improved as compared with a case where a plasma polymerization film is formed on only one of the surfaces described above.

The retardation plates 180 in the polarization conversion element 1 according to the present embodiment are so disposed that they are set apart from the light exiting surfaces 116 of the light transmissive substrates 110. An antireflection film can therefore be readily formed on each of the surfaces of the retardation plates 180 and the light transmissive substrates 110, whereby the light transmissive substrates 110 and the retardation plates 180 can transmit linearly polarized light by an increased amount.

The projector 300 according to the present embodiment, which includes the polarization conversion element 1 having improved light fastness, can maintain its optical quality for a long period even when a high-luminance light source apparatus 30 is used.

The method for manufacturing the polarization conversion element 1 according to the present embodiment, which includes the polarization separation film formation step, the reflection film formation step, the plasma polymerization film formation step, the second plasma polymerization film formation step, the activation step, the second activation step, the first bonding step, the adhesive layer formation step, the second bonding step, and the cutting step, allows the polarization conversion element 1 including the first bonding layers 150, each of which is formed of the plasma polymerization film 151, and the second bonding layers 160, each of which is formed of the adhesive layer 161, to be readily and efficiently manufactured.

Second Embodiment

Figure 11A:
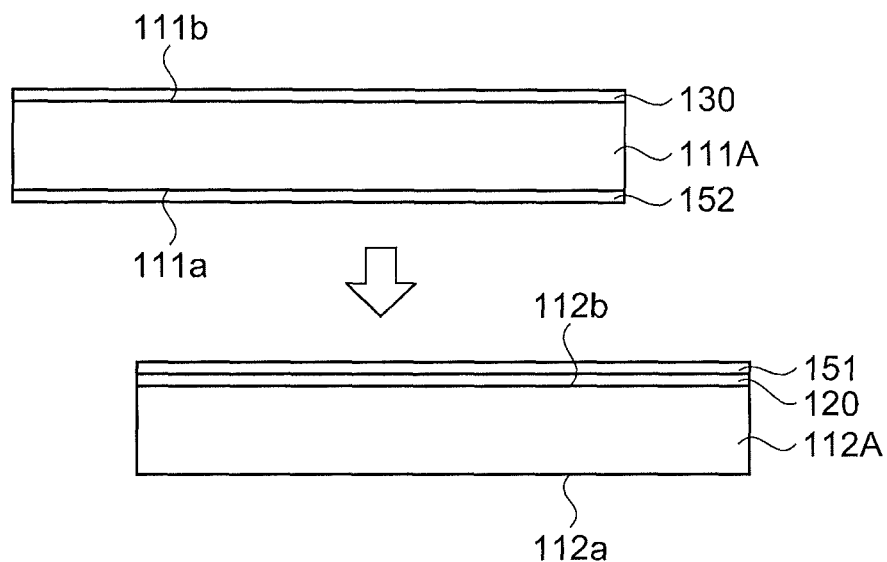
FIGS. 11A and 11B show steps of manufacturing a polarization conversion element according to a second embodiment from the polarization separation film formation step to the first bonding step.
Figure 11B:
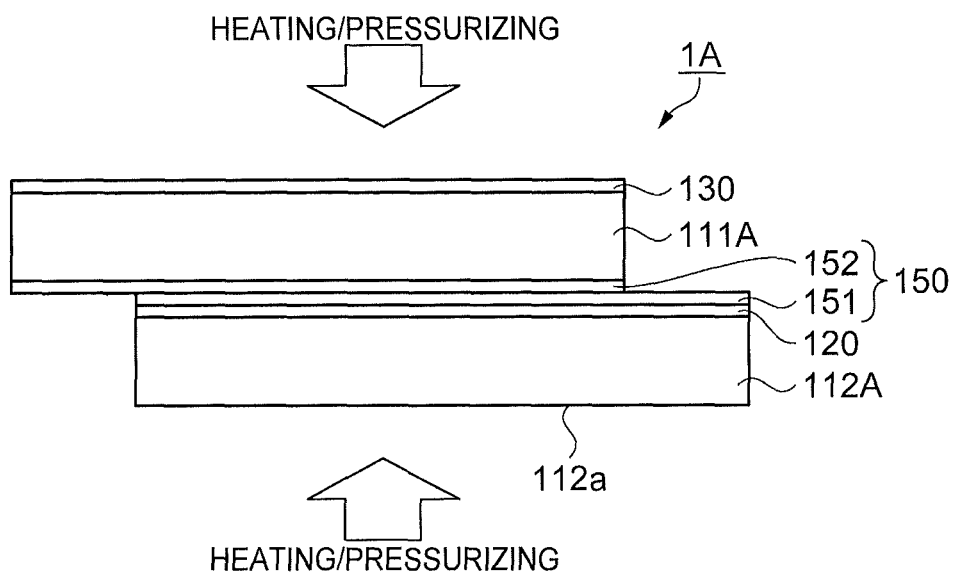
Figure 12:
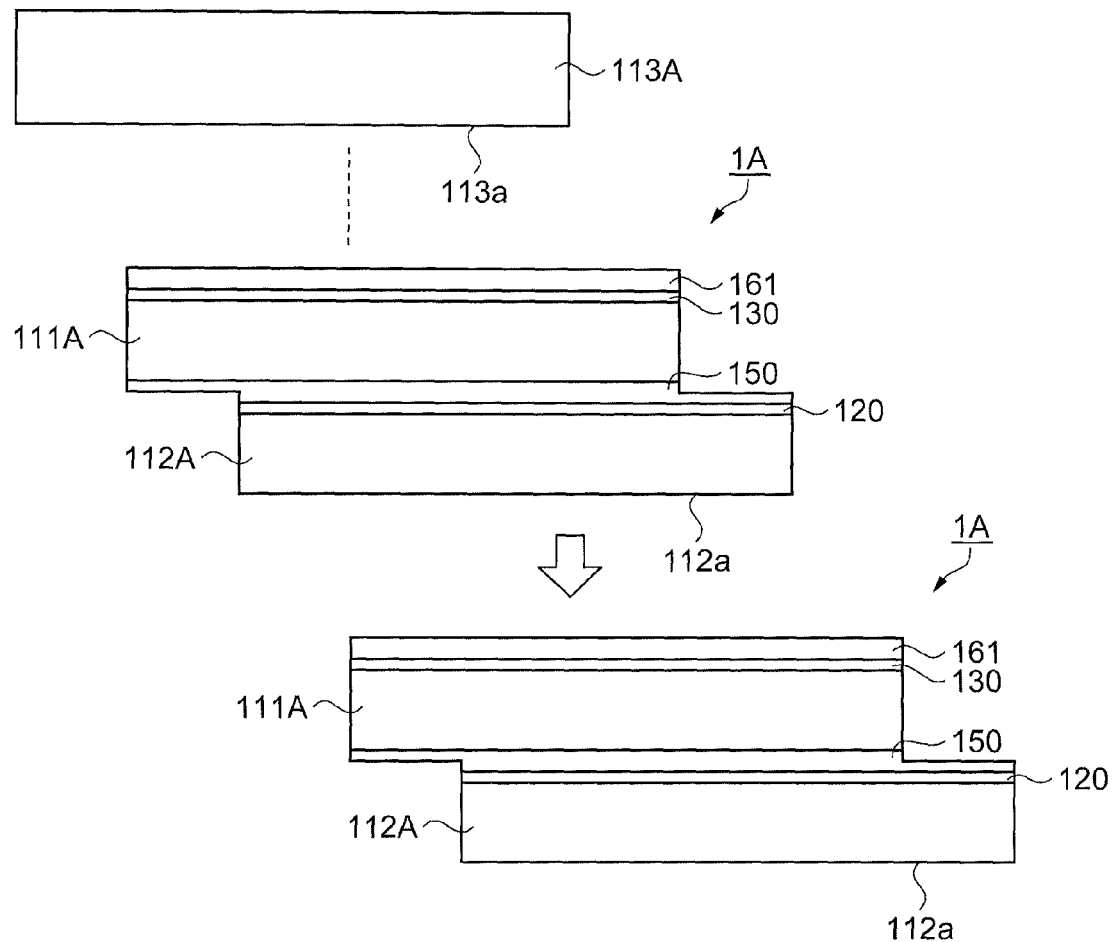
FIG. 12 shows the adhesive layer formation step.
Figure 13:
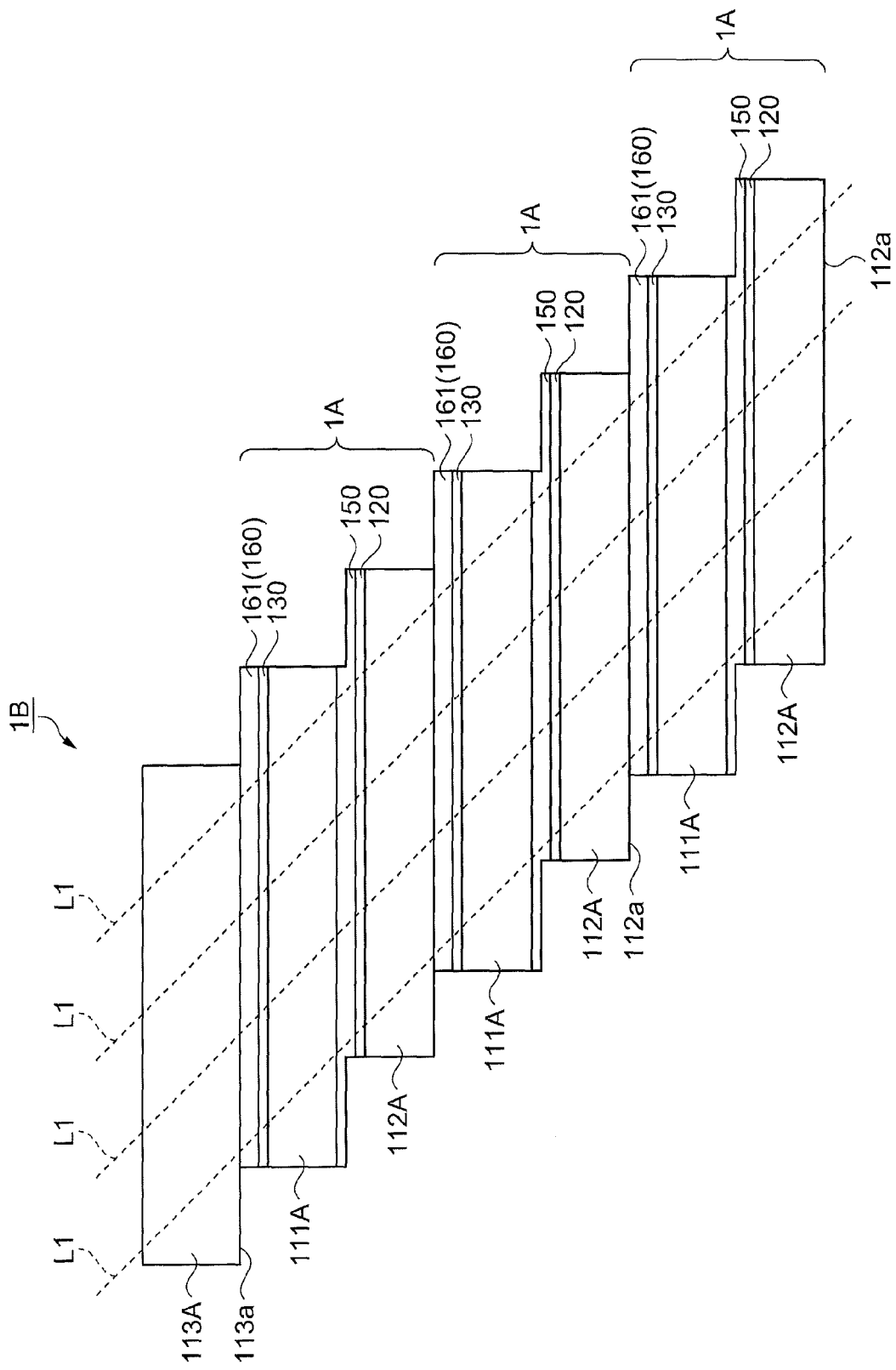
FIG. 13 shows the second bonding step and the cutting step.

FIGS. 11A and 11B show steps of manufacturing the polarization conversion element 1 according to a second embodiment from the polarization separation film formation step to the first bonding step. FIG. 12 shows the adhesive layer formation step. FIG. 13 shows the second bonding step and the cutting step. FIGS. 14A to 14C show the end processing step and the third bonding step. The configuration of the polarization conversion element 1 and the method for manufacturing the polarization conversion element 1 according to the second embodiment will be described with reference to FIGS. 11A and 11B to FIGS. 14A to 14C.

The polarization conversion element 1 according to the first embodiment described above is so configured that the polarization separation films 120 are formed on the first surfaces 111*a* of the first substrates 111A, which form the first light transmissive substrates 111, and the reflection films 130 are formed on the second surfaces 111*b* of the first substrates 111A. In contrast, the polarization conversion element 1 according to the present embodiment has a different configuration in which the polarization separation films 120 are formed on the second substrates 112A, which form the second light transmissive substrates 112, and the reflection films 130 are formed on the first substrates 111A, which form the first light transmissive substrates 111.

In the following sections, portions different from those in the first embodiment will be primarily described. Portions that are not described are substantially the same as those in the first embodiment. In the present embodiment, the polarization conversion element is formed of members having the same functions as those in the first embodiment, and the members therefore have the same reference characters.
Polarization separation film formation step, Reflection film formation step, Plasma polymerization film formation step, Second plasma polymerization film formation step In the present embodiment, as shown in FIG. 11A, the polarization separation film 120 is formed on the second surface 112*b* of each of the second substrates 112A in the polarization separation film formation step. The reflection film 130 is formed on the second surface 111*b* of each of the first substrates 111A in the reflection film formation step. The plasma polymerization film 151 is formed on the surface of the polarization separation film 120 formed on the second substrate 112A in the plasma polymerization film formation step. At the same time, the second plasma polymerization film 152 is formed on the first surface 111*a* of the first substrate 111A in the second plasma polymerization film formation step.
Activation Step, Second Activation Step The plasma polymerization film 151 on the second substrate 112A and the second plasma polymerization film 152 on the first substrate 111A are then activated by plasma irradiation in the activation step and the second activation step.
First Bonding Step The second plasma polymerization film 152 formed on the first surface 111*a* of the first substrate 111A is then layered on the plasma polymerization film 151 formed on the polarization separation film 120 on the second substrate 112A in the first bonding step. When the plasma polymerization films are layered on each other, the first substrate 111A and the second substrate 112A are so arranged that the ends thereof are shifted from each other. A fixture (not shown) is then used to heat and pressurize the layered first substrate 111A and the second substrate 112A from opposite sides, as shown in FIG. 11B. As a result, the plasma polymerization film 151 and the second plasma polymerization film 152 are securely bonded to each other based on molecular bonding Si—O—Si or siloxane bonding to form the first bonding layer 150. The first substrate 111A and the second substrate 112A are integrated with each other to form the first block 1A in the first bonding step.
Adhesive Layer Formation Step To bond the first surface 112*a* of the second substrate 112A that forms one first block 1A to the reflection film 130 on the first substrate 111A that forms another first block 1A, an adhesive is applied onto the surface of the reflection film 130 that forms the another first block 1A to form the adhesive layer 161 in the present embodiment, as shown in FIG. 12. The adhesive layer 161 is then successively formed on the surface of the reflection film 130 on each of a plurality of first blocks 1A in correspondence with the number of blocks to be layered on each other.

The first blocks 1A are then so arranged that they are sequentially layered on each other. Specifically, the first surface 112*a* of the second substrate 112A that forms one first block 1A is layered on the adhesive layer 161 having been applied onto the reflection film 130 on the first substrate 111A that forms another first block 1A. The layering operation is repeated in correspondence with the number of necessary blocks.

As in the first embodiment, the third substrate 113A (surface 113*a* of third substrate 113A) is layered on the final first block 1A of the sequentially layered first blocks 1A, as shown in FIG. 12, in the present embodiment.
Second Bonding Step The plurality of first blocks 1A layered as shown in FIG. 13 are irradiated with ultraviolet light. The ultraviolet light cures the adhesive layers 161 to form the second bonding layers 160. The second bonding layers 160 allow the plurality of layered first blocks 1A to form the unitary second block 1B.
Cutting Step The second block 1B is cut at a predetermined angle (45° (indicated by broken lines L1)) with respect to a flat plane of the second block 1B (first surfaces 112*a* of second substrates 112A, for example) at predetermined intervals, as shown in FIG. 13. As a result, a plurality of stacked blocks 11A are formed. FIG. 14A shows one of the stacked blocks 11A formed in the cutting step.

Forming the stacked blocks 11A allows the first substrates 111A to form the first light transmissive substrates 111 and the second substrates 112A to form the second light transmissive substrate 112, as shown in FIG. 14A. Further, the third substrate 113A forms the third light transmissive substrate 113. The cut surfaces 115*a* and 116*a*, along which the cutting has been performed and which are parallel to each other, are processed to form the light incident surface 115 and the light exiting surface 116 parallel to each other in a step described later.
End Processing Step The end processing step includes the first grinding step, the end cutting step of forming the stacked block 11B, and the second grinding step. The end processing step in the present embodiment is the same as that in the first embodiment and will therefore not be described. In the end cutting step, both ends of each of the stacked blocks 11A are cut in the direction perpendicular to the cut surface 115*a* of the stacked block 11A (indicated by broken lines L21 and L22), as shown in FIG. 14A.

The stacked block 11A in the present embodiment differs from the stacked block 11A in the first embodiment in that the order in which each of the first bonding layers 150 and the adjacent polarization separation film 120 are arranged in the present embodiment is reversed as compared with the arrangement order in the first embodiment, as shown in FIGS. 14A and 14B and FIGS. 8A and 8B. The reason for this is that the polarization separation films 120 are formed on the second substrates 112A and the reflection films 130 are formed on the first substrates 111A (polarization separation films 120 and reflection films 130 are formed on separate substrates).

Third Bonding Step

The cut surfaces 117 are so bonded to each other that one stacked block 11B and another stacked block 11B are symmetrically disposed (constituent members thereof are symmetrically disposed), as shown in FIG. 14C. The bonding is performed by applying a UV curable adhesive onto one of the cut surfaces 117, layering the one cut surface 117 on the other cut surface 117, and irradiating the resultant structure with ultraviolet light to cure the adhesive. The layer formed by the bonding operation is the third bonding layer 165. The polarization conversion element body 11 is thus formed.

After the polarization conversion element body 11 is formed, the cut surface 115a described above functions as the light incident surface 115, on which the light having exited out of the second lens array 312 is incident, in the present embodiment. The cut surface 116a described above functions as the light exiting surface 116, through which polarized light separated by the polarization conversion element body 11 exits.

Antireflection Film Formation Step, Retardation Plate Placement Step

An antireflection film is formed on the surfaces of the polarization conversion element body 11 and the retardation plates 180 in the antireflection film formation step, as in the first embodiment. The retardation plates 180 are placed along the polarization conversion element body 11 to form the polarization conversion element 1 in the retardation plate placement step, as in the first embodiment.

Figure 15:
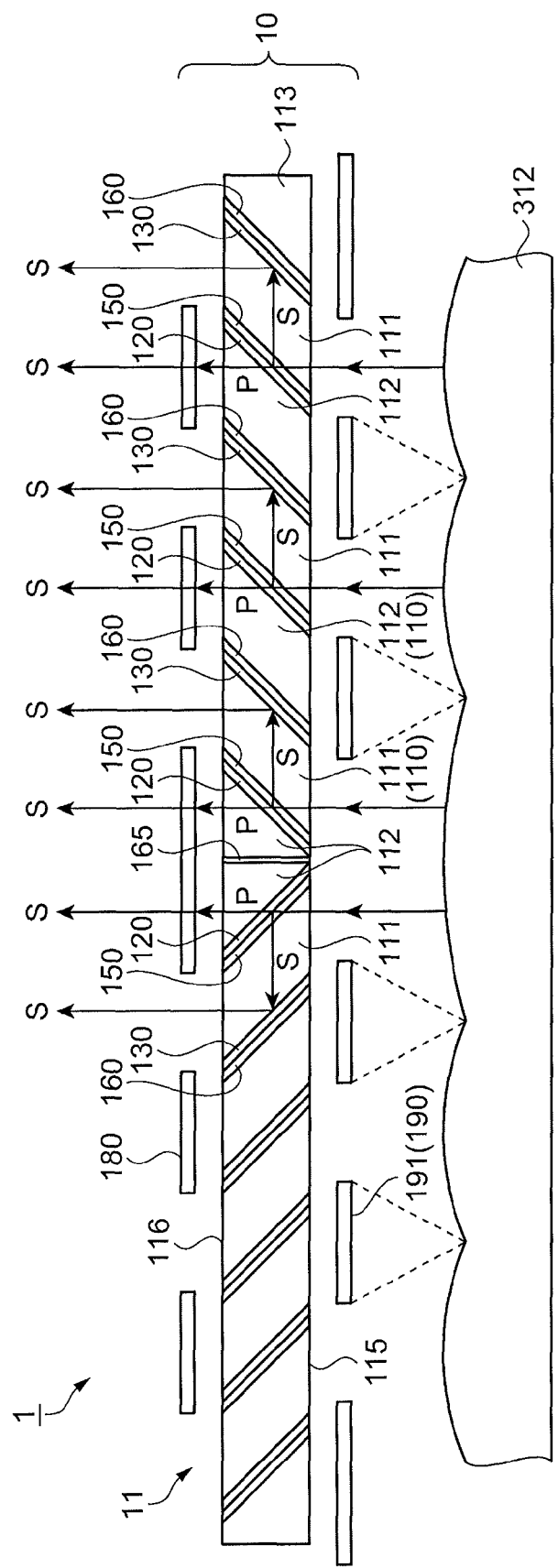
FIG. 15 is a cross-sectional view showing a state in which the polarization conversion element is placed in a fixing frame.

FIG. 15 is a cross-sectional view showing a state in which the polarization conversion element 1 is placed in the fixing frame 190. A description will be made of the operation of the polarization conversion element 1 according to the present embodiment, specifically, operation different from the operation of the polarization conversion element 1 according to the first embodiment with reference to FIG. 15.

In the polarization conversion element 1 according to the present embodiment, operation different from the operation of the polarization conversion element 1 according to the first embodiment results from the difference in the order in which each of the first bonding layers 150 and the adjacent polarization separation film 120 are arranged in the present embodiment is reversed as compared with the arrangement order in the first embodiment.

Specifically, light incident on the light incident surfaces 115 of the first light transmissive substrates 111 of the polarization conversion element 1 passes through the first bonding layers 150, each of which is formed of the plasma polymerization film 151, and is then incident on the polarization separation films 120, which separate the incident light into P-polarized light and S-polarized light, as shown in FIG. 15. In the present embodiment, the P-polarized light passes through the polarization separation films 120. The S-polarized light is so reflected off the polarization separation films 120 that the optical path of the S-polarized light is changed by about 90°, passes through the first bonding layers 150 again, and then passes through the first light transmissive substrates 111.

The P-polarized light having passed through the polarization separation films 120 passes through the second light transmissive substrates 112 and exits through the light exiting surface 116. The P-polarized light having exited through the light exiting surface 116 is converted by the retardation plates 180 into S-polarized light, which exits out of the polarization conversion element 1 (retardation plates 180), as in the first embodiment.

On the other hand, the S-polarized light having been reflected off the polarization separation films 120, having passed through the first bonding layers 150, and having passed through the first light transmissive substrates 111 is reflected off the reflection films 130. The S-polarized light reflected off the reflection films 130 travels along the optical path changed by about 90°, passes through the first light transmissive substrates 111, and exits as S-polarized light through the light exiting surface 116. The light having exited out of the polarization conversion apparatus 10 (polarization conversion element 1) is therefore limited to S-polarized light, as in the first embodiment.

The reflection films 130 are bonded to the second light transmissive substrates 112 via the second bonding layers 160, each of which is formed of the adhesive layer 161. The S-polarized light reflected off the polarization separation films 120 is reflected off the reflection films 130 and hence does not pass through the second bonding layers 160.

According to the embodiment described above, the following advantageous effect is provided in addition to the advantageous effects in the first embodiment.

In the polarization conversion element 1 according to the present embodiment, the polarization separation films 120 are formed on the second light transmissive substrates 112 (second substrates 112A), and the reflection films 130 are formed on the first light transmissive substrates 111 (first substrates 111A). In other words, the polarization separation films 120 are formed on one of the two types of substrate, and the reflection films 130 are formed on the other type of substrate. The thus configured polarization conversion element 1, the light incident thereon passes through the first bonding layers 150 and is then separated by the polarization separation films 120, and the linearly polarized light reflected off the polarization separation films 120 (S-polarized light) passes through the first bonding layers 150 again. In this configuration, in which each of the first bonding layers 150 is formed of the plasma polymerization film 151 and the second plasma polymerization film 152, the light fastness and heat resistance against the incident light and the linearly polarized light (S-polarized light) that passes through the first bonding layers 150 can be improved as compared with a case where a UV curable adhesive is used. The advantageous effect provided by the second bonding layers 160 (adhesive layers 161) is the same as that in the first embodiment.

The configuration allows the polarization conversion element 1 to be improved in terms of light fastness and readily manufactured.

Further, since the configuration of the polarization conversion element can be chosen from the configuration in the first embodiment in which the polarization separation films 120 and the reflection films 130 are formed on one of the two types of substrate and the configuration in the present embodiment in which the polarization separation films 120 and the reflection films 130 are formed on separate substrates, the polarization conversion element can be manufactured in a flexible manner.

The invention is not limited to the embodiments described above, and a variety of changes, improvements, and other modifications can be made thereto to the extent that they do not depart from the substance of the invention. Variations will be described below.

In the polarization conversion element 1 according to the first embodiment described above, the plasma polymerization films 151 are formed on the surfaces of the polarization separation films 120 on the first substrates 111A, and the second plasma polymerization films 152 are formed on the second surfaces 112b of the second substrates 112A. Instead, the first bonding layers 150 may be formed by forming the plasma polymerization films on one of the two types of surface (surface of each polarization separation film 120 or second surface 112b of each second substrate 112A). The same holds true for the second embodiment described above.

In the manufacturing process in the first embodiment, even in a case where the polarization separation films 120 are formed on the first surfaces 111a of the first substrates 111A, and the plasma polymerization films 151 are formed on the surfaces of the polarization separation films 120, but no film is formed on the second surfaces 112b of the second substrates 112A, the plasma polymerization films are eventually formed on the second surfaces 112b of the second substrates 112A (second light transmissive substrates 112) in the completed polarization conversion element 1.

In the manufacturing process in the second embodiment, even in a case where the polarization separation films 120 are formed on the second surfaces 112b of the second substrates 112A, and the plasma polymerization films 151 are formed on the surfaces of the polarization separation films 120, but no film is formed on the first surfaces 111a of the first substrates 111A, the plasma polymerization films are eventually formed on the first surfaces 111a of the first substrates 111A (first light transmissive substrates 111) in the completed polarization conversion element 1.

In the manufacturing processes in the first and second embodiments, even in a case where the reflection films 130 are formed on the second surfaces 111b of the first substrates 111A, and the adhesive layers 161 are formed on the reflection films 130, but no film is formed on the first surfaces 112a of the second substrates 112A, the adhesive layers 161 are eventually formed on the first surfaces 112a of the second substrates 112A (second light transmissive substrates 112) in the completed polarization conversion element 1.

The polarization conversion element 1 according to the first embodiment described above is so configured that incident light rays having exited out of the second lens array 312 are all converted into S-polarized light before outputted. Instead, the incident light rays may be converted into P-polarized light before outputted. In this case, the retardation plates 180 only need to be disposed in correspondence with the portions of the light exiting surface 116 through which S-polarized light separated by the polarization separation films 120 and reflected off the reflection films 130 exits (in other words, in correspondence with reflection films 130). The same holds true for the second embodiment.

The polarization conversion element 1 according to the first embodiment described above is configured as the polarization conversion apparatus 10 in which the polarization conversion element 1 is placed in the fixing frame 190, in which the light blocking plates 191 are formed. Instead, light blocking films may be formed, for example, in an evaporation process on the light incident surface 115 of the polarization conversion element 1 in place of the light blocking plates 191. The same holds true for the second embodiment described above.

In the polarization conversion element 1 according to the first embodiment described above, the retardation plates 180 are so placed that they are set apart from the light exiting surfaces 116 of the light transmissive substrates 110 (second light transmissive substrates 112). Instead, the retardation plates 180 may be bonded to the light exiting surfaces 116 of the light transmissive substrates 110 via plasma polymerization films. In this case, the bonding layers each of which is formed of the plasma polymerization film have improved light fastness and heat resistance. Further, the dimension (thickness) of the polarization conversion element 1 in the direction in which the linearly polarized light travel can be reduced (thinner) as compared with the configuration in which the retardation plates 180 are so placed that they are set apart from the light exiting surfaces 116 of the light transmissive substrates 110. The same holds true for the second embodiment described above.

In the polarization conversion element 1 according to the first embodiment described above, the polarization separation films 120 and the reflection films 130 are formed on the first light transmissive substrates 111 (first substrates 111A), but the polarization separation films 120 and the reflection films 130 may instead be formed on the second light transmissive substrates 112 (second substrates 112A). Similarly, in the polarization conversion element 1 according to the second embodiment described above, the polarization separation films 120 are formed on the second light transmissive substrates 112 (second substrates 112A) and the reflection films 130 are formed on the first light transmissive substrates 111 (first substrates 111A), but the polarization separation films 120 may be formed on the first light transmissive substrates 111 (first substrates 111A) and the reflection films 130 may be formed on the second light transmissive substrates 112 (second substrates 112A).

In the polarization conversion element 1 according to the first embodiment described above, the cut surfaces 117 used to bond the stacked blocks 11B to each other (third bonding step) are formed on the second light transmissive substrates 112 (second substrates 112A). Instead, the light transmissive substrates (base substrates) on which the cut surfaces 117 are formed are not necessarily the second substrates 112A but may be different substrates that are made of the same material as that of the second substrates 112A but are thicker than the second substrates 112A. In this case, in the end processing step (end cutting step), the cutting position (position of broken line L21 (FIG. 8A)) can be so set on the cut surface 115a that the cut position is slightly apart from the position where the thicker substrate, which is the cut-end portion, is bonded to the corresponding polarization separation film 120 (first bonding layer 150), whereby the thicker substrate can have a cutting margin and a positional deviation in the slicer cutting operation can be tolerated. The same holds true for the second embodiment described above.

In the method for manufacturing the polarization conversion element 1 according to the first embodiment described above, in the first bonding step, when each of the first substrates 111A and the corresponding second substrate 112A are layered on each other, the first substrate 111A and the second substrate 112A are so arranged that the ends thereof are shifted from each other. Instead, the first substrate 111A and the second substrate 112A may be so arranged that the ends thereof are not shifted from each other but are aligned with each other. This configuration prevents dust from entering the space between the layered first substrate 111A and second substrate 112A. The same holds true for the second embodiment described above.

The projector 300 according to each of the first and second embodiments described above uses transmissive liquid crystal panels 341 as the electro-optical apparatus 34. The electro-optical apparatus 34 does not necessarily use transmissive liquid crystal panels but may use reflective liquid crystal panels.

The projector 300 according to each of the first and second embodiments described above uses the three liquid crystal panels 341R, 341G, and 341B as the electro-optical apparatus 34, but the electro-optical apparatus 34 is not necessarily formed of three liquid crystal panels. The invention is also applicable to an electro-optical apparatus using one or two liquid crystal panels or an electro-optical apparatus using four or more liquid crystal panels.

In the optical system of the projector 300 according to each of the first and second embodiments described above, the light source apparatus 30 uses a discharge-type light source. The light source apparatus may instead use a solid-state light source. Examples of the solid-state light source may include a laser light source, an LED (light emitting diode), an organic EL (electro luminescence) device, a silicon light emitting device, and a variety of other solid-state light emitting devices.

The entire disclosure of Japanese Patent Application No. 2013-215267, filed Oct. 16, 2013 is expressly incorporated by reference herein.

What is claimed is:

1. A polarization conversion element comprising:
    first light transmissive substrates and second light transmissive substrates each of which has a light incident surface and a light exiting surface and which are disposed alternately;
    polarization separation films that are obliquely disposed with respect to the light incident surfaces and separate incident light into two types of linearly polarized light;
    reflection films that are disposed in parallel to the polarization separation films and reflect one of the two types of linearly polarized light separated by the polarization separation films; and
    retardation plates that convert one of the two types of linearly polarized light separated by the polarization separation films,
    wherein each of the polarization separation films is formed on a first surface of the corresponding first light transmissive substrate,
    each of the reflection films is formed on a second surface of each of the first light transmissive substrates,
    an adhesive layer is formed on a first surface of each of the second light transmissive substrates, and
    the plasma polymerization film is formed on a second surface of each of the second light transmissive substrates.

2. The polarization conversion element according to claim 1,
    wherein one of the two types of linearly polarized light separated by the polarization separation films passes through the first light transmissive substrates, on which the reflection films are formed, and is reflected off the reflection films.

3. The polarization conversion element according to claim 1,
    wherein the plasma polymerization film is formed on at least one of a surface of each of the polarization separation films and a surface of the light transmissive substrate to be bonded to the polarization separation film.

4. The polarization conversion element according to claim 1,
    wherein the retardation plates are placed in positions set apart from the light exiting surface of each of the light transmissive substrates.

5. The polarization conversion element according to claim 1,
    wherein each of the retardation plates is bonded to the light exiting surface of each of the light transmissive substrates via a plasma polymerization film.

6. A projector comprising:
    a light source apparatus that outputs light;
    the polarization conversion element according to claim 1, which converts the light into one type of linearly polarized light;
    a light modulator that modulates the linearly polarized light having exited out of the polarization conversion element in accordance with image information to form an optical image; and
    a projection optical apparatus that enlarges and projects the optical image.

7. A method for manufacturing a polarization conversion element, the method comprising:
    a polarization separation film formation step of forming a polarization separation film on a first surface of a first substrate that has the first surface and a second surface parallel to each other and serves as a base of a first light transmissive substrate;
    a reflection film formation step of forming a reflection film on the second surface of the first substrate;
    a plasma polymerization film formation step of forming a plasma polymerization film on a surface of the polarization separation film;
    an activation step of activating the plasma polymerization film on the first substrate;
    a first bonding step of bonding the activated plasma polymerization film to a second surface of a second substrate that has a first surface and the second surface parallel to each other and serves as a base of a second light transmissive substrate to form a first block formed of the first substrate and the second substrate integrated with each other;
    an adhesive layer formation step of sequentially forming adhesive layers on a plurality of the first blocks, the adhesive layer bonding the first surface of the second substrate that forms one of the first blocks to the reflection film on the first substrate that forms another one of the first blocks;
    a second bonding step of bonding the adhesive layers to each other by curing to form a second block formed of the plurality of the first blocks integrated with each other; and
    a cutting step of cutting the second block at a predetermined angle with respect to the first surfaces and the second surfaces to form a stacked block having a light incident surface and a light exiting surface parallel to each other.

8. The method for manufacturing a polarization conversion element according to claim 7, further comprising:
    a second plasma polymerization film formation step of forming a second plasma polymerization film on the second surface of the second substrate; and
    a second activation step of activating the second plasma polymerization film, wherein in the first bonding step, the activated plasma polymerization film on the first substrate is bonded to the second plasma polymerization film.

9. A method for manufacturing a polarization conversion element, the method comprising:
- a polarization separation film formation step of forming a polarization separation film on a second surface of a second substrate that has a first surface and the second surface parallel to each other and serves as a base of a second light transmissive substrate;
- a plasma polymerization film formation step of forming a plasma polymerization film on a surface of the polarization separation film;
- a reflection film formation step of forming a reflection film on a second surface of a first substrate that has a first surface and the second surface parallel to each other and serves as a base of a first light transmissive substrate;
- an activation step of activating the plasma polymerization film on the second substrate;
- a first bonding step of bonding the activated plasma polymerization film to the first surface of the first substrate to form a first block formed of the first substrate and the second substrate integrated with each other;
- an adhesive layer formation step of sequentially forming adhesive layers on a plurality of the first blocks, the adhesive layer bonding the reflection film on the first substrate that forms one of the first blocks to the first surface of the second substrate that forms another one of the first blocks;
- a second bonding step of bonding the adhesive layers to each other by curing to form a second block formed of the plurality of the first blocks integrated with each other; and
- a cutting step of cutting the second block at a predetermined angle with respect to the first surfaces and the second surfaces to form a stacked block having a light incident surface and a light exiting surface parallel to each other.

10. The method for manufacturing a polarization conversion element according to claim 9, further comprising:
- a second plasma polymerization film formation step of forming a second plasma polymerization film on the first surface of the first substrate; and
- a second activation step of activating the second plasma polymerization film,
- wherein in the first bonding step, the activated plasma polymerization film on the second substrate is bonded to the second plasma polymerization film.

* * * * *